United States Patent
Jasoriya et al.

(10) Patent No.: US 12,254,035 B1
(45) Date of Patent: Mar. 18, 2025

(54) METHOD AND SYSTEM FOR RECOMMENDING TEST CASES USING MACHINE LEARNING MODELS

(71) Applicant: Dell Products L.P., Round Rock, TX (US)

(72) Inventors: Shreyans Suresh Jasoriya, Brighton, MA (US); Gajanan Suresh Natu, Cary, NC (US); Michael John Catalanotti, Hudson, NH (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/648,956

(22) Filed: Apr. 29, 2024

(51) Int. Cl.
*G06F 16/33* (2025.01)
*G06F 16/334* (2025.01)
*G06F 16/358* (2025.01)

(52) U.S. Cl.
CPC ........ *G06F 16/3347* (2019.01); *G06F 16/358* (2019.01)

(58) Field of Classification Search
CPC .......................... G06F 16/3347; G06F 16/358
See application file for complete search history.

(56) References Cited

U.S. PATENT DOCUMENTS

2012/0265531 A1* 10/2012 Bennett ............... G06F 16/3344
704/E15.005

* cited by examiner

*Primary Examiner* — Baoquoc N To
(74) *Attorney, Agent, or Firm* — Aly Z. Dossa; Chamberlain, Hrdlicka, White, Williams & Aughtry

(57) ABSTRACT

A method for recommending a test case (TC) includes: obtaining TCs; obtaining a document associated with the TCs; analyzing the TCs and document to generate a reference document (RD); transforming, the RD into a first embedding vector (EV); receiving a query about a recommendation from an administrator; analyzing the query to infer a length of the query; making a first determination that the length of the query is greater than an input length of a model; based on the first determination, employing a summarizer model to obtain a summarized query; transforming, the summarized query into a second EV; performing a search for a most matching asset; analyzing the summarized query and most matching asset to generate the recommendation; making a second determination that the recommendation is generated; and initiating displaying of the recommendation to the administrator.

20 Claims, 6 Drawing Sheets

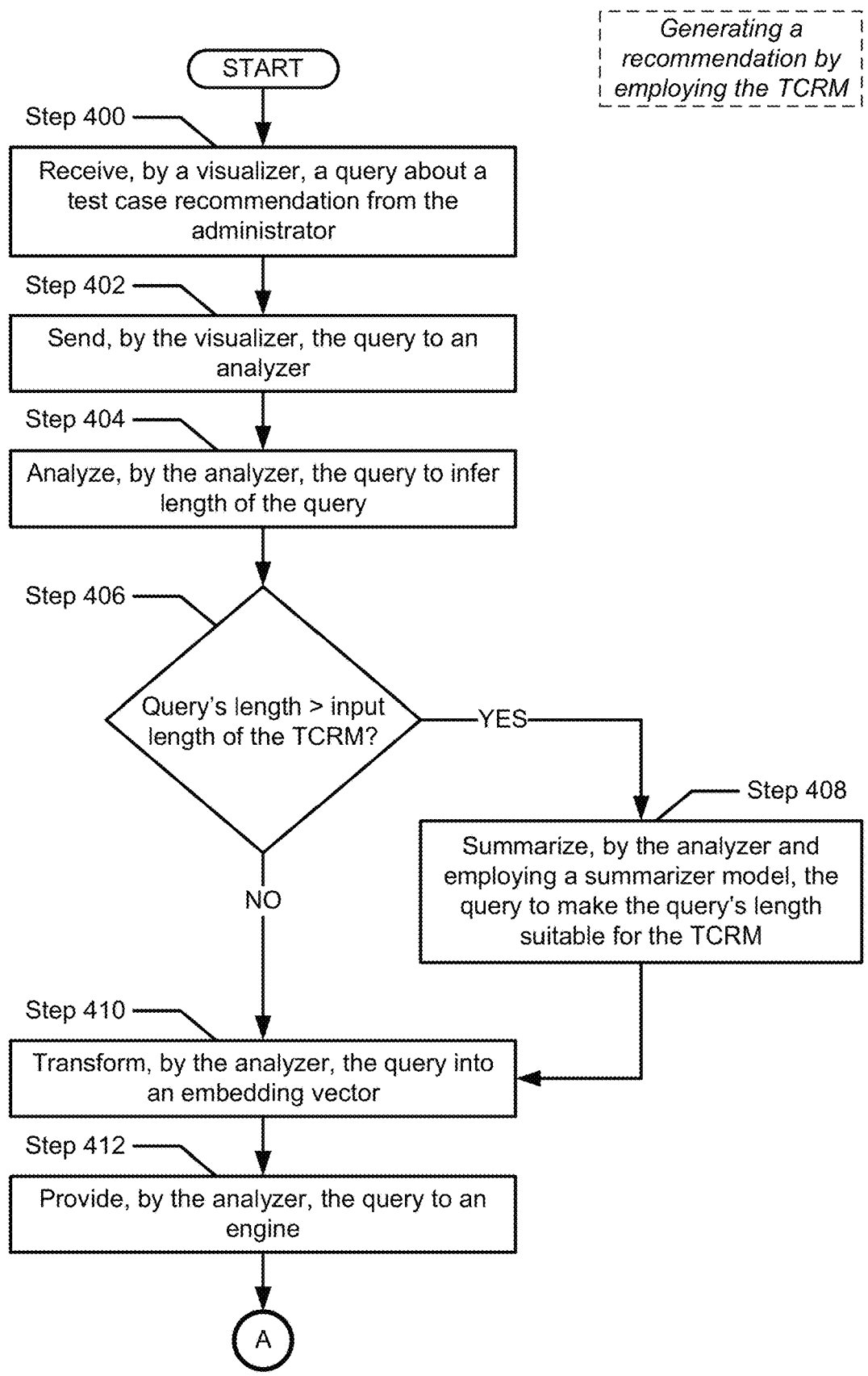
FIG. 4.1

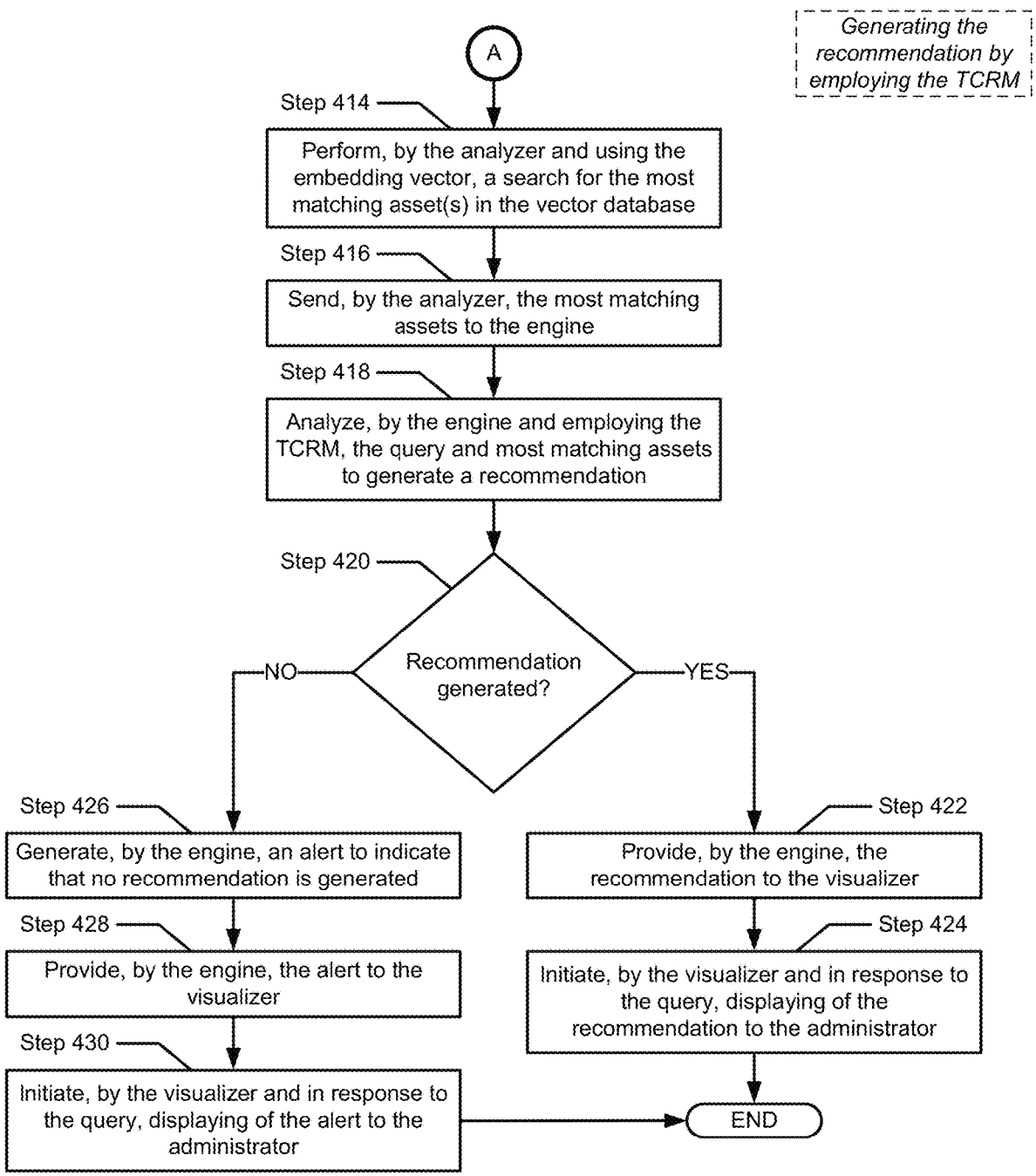
FIG. 4.2

METHOD AND SYSTEM FOR RECOMMENDING TEST CASES USING MACHINE LEARNING MODELS

BACKGROUND

Devices are often capable of performing certain functionalities that other devices are not configured to perform, or are not capable of performing. In such scenarios, it may be desirable to adapt one or more systems to enhance the functionalities of devices that cannot perform those functionalities.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example, and are not meant to limit the scope of the claims.

FIGS. 4.1 and 4.2 show a method for generating a recommendation by employing a model in accordance with one or more embodiments disclosed herein.

DETAILED DESCRIPTION

Figure 1:
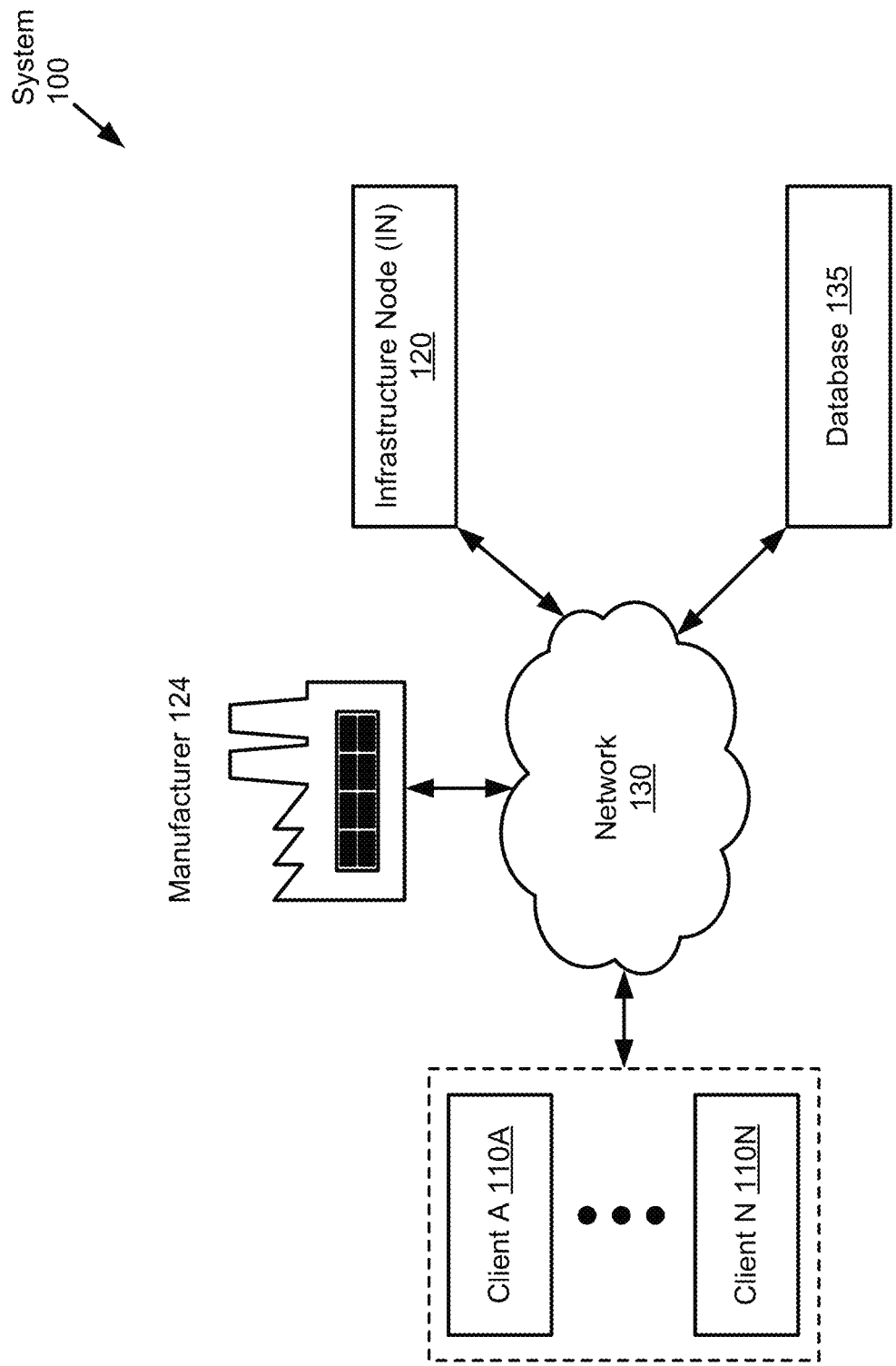
FIG. 1 shows a diagram of a system in accordance with one or more embodiments disclosed herein.

Specific embodiments disclosed herein will now be described in detail with reference to the accompanying figures. In the following detailed description of the embodiments disclosed herein, numerous specific details are set forth in order to provide a more thorough understanding of one or more embodiments disclosed herein. However, it will be apparent to one of ordinary skill in the art that the one or more embodiments disclosed herein may be practiced without these specific details. In other instances, well-known features have not been described in detail to avoid unnecessarily complicating the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, large enterprise technical projects have millions of lines of code and thousands of associated tests (or test cases such as, for example, component test cases, functionality test cases, end-to-end test cases, etc.) to ensure quality. Enterprise quality assurance teams (e.g., administrators) are spending significant time and energy (i) to manage these massive amounts of data and (ii) to obtain useful insights (e.g., whether or not data protection policies implemented by a user/customer work properly, types of workloads protected by those policies, etc.) from one or more computing devices (e.g., data protection modules that are deployed to users) in order to internally manage those computing devices.

In most cases, in order to internally manage those computing devices, administrators utilize a test case management tool/suite to define and maintain a repository of test cases, in which these test cases may need to be executed when (i) testing a feature change (e.g., after adding Feature X to Storage Array T, whether or not Storage Array T is operating as expected) in a computing device (e.g., a client) before deploying the client to a user, (ii) validating a root cause of a failure identified (and reported by the user) in the computing device, and (iii) testing a fix/solution for the failure.

For example, for a complex data protection system, to infer (and manage) differences (e.g., workload-related differences, scalability-related differences, etc.) between how administrators/vendors are testing different aspects (e.g., reliability, scalability, user-friendliness, etc.) of modules/components of the system and how users are utilizing the system, the test case management tool may include, at least, 50,000 test cases. However, these vast numbers of test cases make it sub-optimal to execute all the test cases, for example, for each feature change. Because of that, administrators may have to rely on subject matter experts' expertise to identify one or more test cases to be executed (e.g., to validate a failure and/or fix the failure).

Nonetheless, in some cases, a subject matter expert may manually select test cases (based on his/her subjective insights (e.g., without having domain knowledge)) with respect to features that have been added or removed (from a corresponding computing device). Further, in some cases, it may not be possible to regenerate a scenario (that is initiated by a user unintentionally) to validate (and fix) a feature change made by the user because, for example, the test case management tool may not include test cases for that specific scenario.

On the other hand, traditional approaches are not enough to overcome the aforementioned issues because these approaches mostly focus on system, functionality, and/or regression tests targeting specific features of corresponding computing devices/systems (e.g., deleting a volume from a data protection system). For example, performing regression tests periodically may not be feasible because of computing resource and time limitations, which may cause shipping a related computing device without performing/considering all the required test cases (e.g., the device may be shipped with improperly tested features).

For at least the reasons discussed above and without requiring resource-intensive efforts (e.g., time, engineering, etc.), a fundamentally different approach/framework is needed (e.g., a framework that leverages large language models (LLMs) to recommend one or more test cases to be executed based on a feature description/change (e.g., if a newer feature is added (by an administrator) to a computing device, the feature description may specify how the feature should operate, how the device should operate after adding the feature, etc.) or a triage analysis of a failure (e.g., once the failure is detected, telemetry data obtained from the device can be analyzed to infer (a) how a related user was using the device and (b) the actual test results of the device and expected test results of the device, and based on (a)-(b), possible reasons of the failure may be determined) in a more effective, secure, and reliable way).

Embodiments disclosed herein relate to methods and systems for recommending test cases using machine learning (ML) models. As a result of the processes discussed below, one or more embodiments disclosed herein advantageously ensure that: (i) administrators do not need to spend significant time and energy (a) for managing massive amounts of data and (b) for obtaining useful insights from one or more computing devices (and their components) in order to internally manage those computing devices (and their components); (ii) administrators do not need to rely on subject matter experts' expertise to identify one or more test cases to be executed (e.g., so that useful and detailed insights can be extracted from metadata (e.g., telemetry data that is obtained from a computing device) more easily (e.g., to identify a user profile of a user, to take one or more preventive (and proactive) actions)); (iii) based on (ii), administrators can manage differences between product (e.g., a hardware component, a software component, etc.) testing activities and product utilization activities for pinpoint product management and development (e.g., for a better user experience); (iv) based on (ii), administrators can invest most of their time and engineering effort to make correct decisions with respect to product investment opportunities (rather than second-guessing); (v) the framework proactively identifies scenarios (or use cases) that a corresponding test case management tool does not include test cases for and report those scenarios to an administrator via an alert/notification (to indicate that there are one or more test case gaps in the tool because no test cases are recommended to a second administrator based on his/her query); (vi) without suffering from computing resource limitations, the framework allows a related administrator to consider all required test cases before deploying a related computing device to a user; and/or (vii) the framework recommends one or more test cases to be executed based on a feature specific documentation (e.g., a user guide (or a technical document) for the feature that includes one or more feature descriptions) or a triage analysis of a failure (e.g., a root cause analysis of the failure).

The following describes various embodiments disclosed herein.

FIG. 1 shows a diagram of a system (100) in accordance with one or more embodiments disclosed herein. The system (100) includes any number of clients (e.g., Client A (110A), Client N (110N), etc.), a network (130), any number of infrastructure nodes (INs) (e.g., 120), a manufacturer (124), and a database (135). The system (100) may include additional, fewer, and/or different components without departing from the scope of the embodiments disclosed herein. For example, while shown as including only one IN (e.g., 120), the system (100) may include more INs (e.g., a group of INs including at least fifty INs). Each component may be operably/operatively connected to any of the other components via any combination of wired and/or wireless connections. Each component illustrated in FIG. 1 is discussed below.

In one or more embodiments, the clients (e.g., 110A, 110N, etc.), the IN (120), the network (130), the manufacturer (124), and the database (135) may be (or may include) physical hardware or logical devices, as discussed below. While FIG. 1 shows a specific configuration of the system (100), other configurations may be used without departing from the scope of the embodiments disclosed herein. For example, although the clients (e.g., 110A, 110N, etc.) and the IN (120) are shown to be operatively connected through a communication network (e.g., 130), the clients (e.g., 110A, 110N, etc.) and the IN (120) may be directly connected (e.g., without an intervening communication network).

Further, the functioning of the clients (e.g., 110A, 110N, etc.) and the IN (120) is not dependent upon the functioning and/or existence of the other components (e.g., devices) in the system (100). Rather, the clients and the IN may function independently and perform operations locally that do not require communication with other components. Accordingly, embodiments disclosed herein should not be limited to the configuration of components shown in FIG. 1.

As used herein, "communication" may refer to simple data passing, or may refer to two or more components coordinating a job. As used herein, the term "data" is intended to be broad in scope. In this manner, that term embraces, for example (but not limited to): a data stream (or stream data), data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

In one or more embodiments, the system (100) may be a distributed system (e.g., a data processing environment) and may deliver at least computing power (e.g., real-time (on the order of milliseconds (ms) or less) network monitoring, server virtualization, etc.), storage capacity (e.g., data backup), and data protection (e.g., software-defined data protection, disaster recovery, etc.) as a service to users of clients (e.g., 110A, 110N, etc.). For example, the system may be configured to organize unbounded, continuously generated data into a data stream. The system (100) may also represent a comprehensive middleware layer executing on computing devices (e.g., 500, FIG. 5) that supports application and storage environments.

In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide computer-implemented services to the users, the system (100) may perform some computations (e.g., data collection, distributed processing of collected data, etc.) locally (e.g., at the users' site using the clients (e.g., 110A, 110N, etc.)) and other computations remotely (e.g., away from the users' site using the IN (120)) from the users. By doing so, the users may utilize different computing devices (e.g., 500, FIG. 5) that have different quantities of computing resources (e.g., processing cycles, memory, storage, etc.) while still being afforded a consistent user experience. For example, by performing some computations remotely, the system (100) (i) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user/customer of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, a client (e.g., 110A, 110N, etc.) may include functionality to, e.g.: (i) capture sensory input (e.g., sensor data) in the form of text, audio, video, touch or motion, (ii) collect massive amounts of data at the edge of an IoT network (where, the collected data may be grouped as: (a) data that needs no further action and does not need to be stored, (b) data that should be retained for later analysis and/or record keeping, and (c) data that requires an immediate action/response), (iii) provide to other entities (e.g., the IN (120)), store, or otherwise utilize captured sensor data (and/or any other type and/or quantity of data), and/or (iv) provide surveillance services (e.g., determining object-level information, performing face recognition, etc.) for scenes (e.g., a physical region of space). One of ordinary skill will appreciate that the client may perform other functionalities without departing from the scope of the embodiments disclosed herein.

In one or more embodiments, the clients (e.g., 110A, 110N, etc.) may be geographically distributed devices (e.g., user devices, front-end devices, etc.) and may have relatively restricted hardware and/or software resources when compared to the IN (120). As being, for example, a sensing device, each of the clients may be adapted to provide monitoring services. For example, a client may monitor the state of a scene (e.g., objects disposed in a scene). The monitoring may be performed by obtaining sensor data from sensors that are adapted to obtain information regarding the scene, in which a client may include and/or be operatively coupled to one or more sensors (e.g., a physical device adapted to obtain information regarding one or more scenes).

In one or more embodiments, the sensor data may be any quantity and types of measurements (e.g., of a scene's properties, of an environment's properties, etc.) over any period(s) of time and/or at any points-in-time (e.g., any type of information obtained from one or more sensors, in which different portions of the sensor data may be associated with different periods of time (when the corresponding portions of sensor data were obtained)). The sensor data may be obtained using one or more sensors. The sensor may be, for example (but not limited to): a visual sensor (e.g., a camera adapted to obtain optical information (e.g., a pattern of light scattered off of the scene) regarding a scene), an audio sensor (e.g., a microphone adapted to obtain auditory information (e.g., a pattern of sound from the scene) regarding a scene), an electromagnetic radiation sensor (e.g., an infrared sensor), a chemical detection sensor, a temperature sensor, a humidity sensor, a count sensor, a distance sensor, a global positioning system sensor, a biological sensor, a differential pressure sensor, a corrosion sensor, etc.

In one or more embodiments, the clients (e.g., 110A, 110N, etc.) may be physical or logical computing devices configured for hosting one or more workloads, or for providing a computing environment whereon workloads may be implemented. The clients may provide computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more service level agreements (SLAs) configured by users of the clients). The clients (e.g., 110A, 110N, etc.) may correspond to computing devices that one or more users use to interact with one or more components of the system (100).

In one or more embodiments, a client (e.g., 110A, 110N, etc.) may include any number of applications (and/or content accessible through the applications) that provide computer-implemented services to a user. Applications may be designed and configured to perform one or more functions instantiated by a user of the client. In order to provide application services, each application may host similar or different components. The components may be, for example (but not limited to): instances of databases, instances of email servers, etc. Applications may be executed on one or more clients as instances of the application.

Applications may vary in different embodiments, but in certain embodiments, applications may be custom developed or commercial (e.g., off-the-shelf) applications that a user desires to execute in a client (e.g., 110A, 110N, etc.). In one or more embodiments, applications may be logical entities executed using computing resources of a client. For example, applications may be implemented as computer instructions stored on persistent storage of the client that when executed by the processor(s) of the client, cause the client to provide the functionality of the applications described throughout the application.

In one or more embodiments, while performing, for example, one or more operations requested by a user, applications installed on a client (e.g., 110A, 110N, etc.) may include functionality to request and use physical and logical resources of the client. Applications may also include functionality to use data stored in storage/memory resources of the client. The applications may perform other types of functionalities not listed above without departing from the scope of the embodiments disclosed herein. While providing application services to a user, applications may store data that may be relevant to the user in storage/memory resources of the client.

In one or more embodiments, to provide services to the users, the clients (e.g., 110A, 110N, etc.) may utilize, rely on, or otherwise cooperate with the IN (120). For example, the clients may issue requests to the IN to receive responses and interact with various components of the IN. The clients may also request data from and/or send data to the IN (for example, the clients may transmit information to the IN that allows the IN to perform computations, the results of which are used by the clients to provide services to the users). As yet another example, the clients may utilize computer-implemented services provided by the IN. When the clients interact with the IN, data that is relevant to the clients may be stored (temporarily or permanently) in the IN.

In one or more embodiments, a client (e.g., 110A, 110N, etc.) may be capable of, e.g.: (i) collecting users' inputs, (ii) correlating collected users' inputs to the computer-implemented services to be provided to the users, (iii) communicating with the IN (120) that perform computations necessary to provide the computer-implemented services, (iv) using the computations performed by the IN to provide the computer-implemented services in a manner that appears (to the users) to be performed locally to the users, and/or (v) communicating with any virtual desktop (VD) in a virtual desktop infrastructure (VDI) environment (or a virtualized architecture) provided by the IN (using any known protocol in the art), for example, to exchange remote desktop traffic or any other regular protocol traffic (so that, once authenticated, users may remotely access independent VDs).

As described above, the clients (e.g., 110A, 110N, etc.) may provide computer-implemented services to users (and/or other computing devices). The clients may provide any number and any type of computer-implemented services. To provide computer-implemented services, each client may include a collection of physical components (e.g., processing resources, storage/memory resources, networking resources, etc.) configured to perform operations of the client and/or otherwise execute a collection of logical components (e.g., virtualization resources) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a central processing unit (CPU), a graphics processing unit (GPU), a data processing unit (DPU), a computation acceleration resource, an application-specific integrated circuit (ASIC), a digital signal processor for facilitating high speed communication, etc.

In one or more embodiments, a storage or memory resource (not shown) may refer to a measurable quantity of a storage/memory-relevant resource type, which can be requested, allocated, and consumed (for example, to store sensor data and provide previously stored data). A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, while the clients (e.g., 110A, 110N, etc.) provide computer-implemented services to users, the clients may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (e.g., 110A, 110N, etc.) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the embodiments disclosed herein.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card (NIC), a network adapter, a network processor, etc.

In one or more embodiments, a networking resource may provide capabilities to interface a client with external entities (e.g., the IN (120)) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transport control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients (e.g., 110A, 110N, etc.). For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU (vCPU), a virtual storage pool, etc.

In one or more embodiments, a virtualization resource may include a hypervisor (e.g., a VM monitor), in which the hypervisor may be configured to orchestrate an operation of, for example, a VM by allocating computing resources of a client (e.g., 110A, 110N, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor. Alternatively, in one or more of embodiments, the hypervisor may be implemented as computer instructions stored on storage/memory resources of the client that when executed by processing resources of the client, cause the client to provide the functionality of the hypervisor.

In one or more embodiments, a client (e.g., 110A, 110N, etc.) may be, for example (but not limited to): a physical computing device, a smartphone, a tablet, a wearable, a gadget, a closed-circuit television (CCTV) camera, a music player, a game controller, etc. Different clients may have different computational capabilities. In one or more embodiments, Client A (110A) may have 16 gigabytes (GB) of dynamic RAM (DRAM) and 1 CPU with 12 cores, whereas Client N (110N) may have 8 GB of PMEM and 1 CPU with 16 cores. Other different computational capabilities of the clients not listed above may also be taken into account without departing from the scope of the embodiments disclosed herein.

Figure 5:
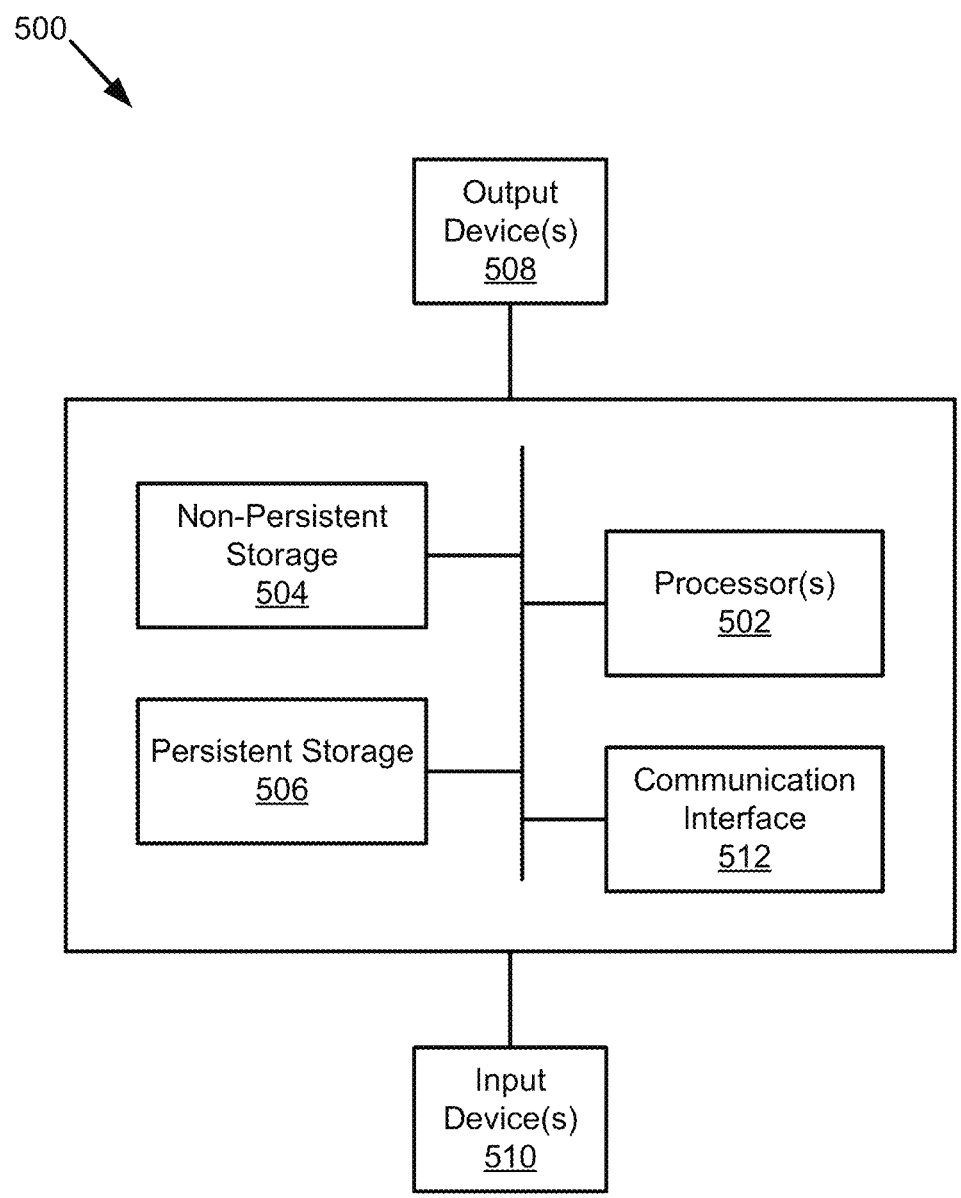
FIG. 5 shows a diagram of a computing device in accordance with one or more embodiments disclosed herein.

Further, in one or more embodiments, a client (e.g., 110A, 110N, etc.) may be implemented as a computing device (e.g., 500, FIG. 5). The computing device may be, for example, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client described throughout the application.

Alternatively, in one or more embodiments, the client (e.g., 110A, 110N, etc.) may be implemented as a logical device (e.g., a VM). The logical device may utilize the computing resources of any number of computing devices to provide the functionality of the client described throughout this application.

In one or more embodiments, users (e.g., customers, administrators, people, etc.) may interact with (or operate) the clients (e.g., 110A, 110N, etc.) in order to perform work-related tasks (e.g., production workloads (e.g., reading data from a table, writing data to the table, etc.)). In one or more embodiments, the accessibility of users to the clients may depend on a regulation set by an administrator of the clients. To this end, each user may have a personalized user account that may, for example, grant access to certain data, applications, and computing resources of the clients. This may be realized by implementing the virtualization technology. In one or more embodiments, an administrator may be a user with permission (e.g., a user that has root-level access) to make changes on the clients that will affect other users of the clients.

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, a GUI may be displayed on a display of a computing device (e.g., 500, FIG. 5) using functionalities of a display engine (not shown), in which the display engine is operatively connected to the computing device. The display engine may be implemented using hardware (or a hardware component), software (or a software component), or any combination thereof. The login screen may be displayed in any visual format that would allow the user to easily comprehend (e.g., read and parse) the listed information.

In one or more embodiments, the IN (120) may include (i) a chassis (e.g., a mechanical structure, a rack mountable enclosure, etc.) configured to house one or more servers (or blades) and their components and (ii) any instrumentality or aggregate of instrumentalities operable to compute, classify, process, transmit, receive, retrieve, originate, switch, store, display, manifest, detect, record, reproduce, handle, and/or utilize any form of data for business, management, entertainment, or other purposes.

In one or more embodiments, the IN (120) may include functionality to, e.g.: (i) obtain (or receive) data (e.g., any type and/or quantity of input) from any source (and, if necessary, aggregate the data); (ii) perform complex analytics and analyze data that is received from one or more clients (e.g., 110A, 110N, etc.) to generate additional data that is derived from the obtained data without experiencing any middleware and hardware limitations; (iii) provide meaningful information (e.g., a response) back to the corresponding clients; (iv) filter data (e.g., received from a client) before pushing the data (and/or the derived data) to the database (135) for management of the data and/or for storage of the data (while pushing the data, the IN may include information regarding a source of the data (e.g., an identifier of the source) so that such information may be used to associate provided data with one or more of the users (or data owners)); (v) host and maintain various workloads; (vi) provide a computing environment whereon workloads may be implemented (e.g., employing linear, non-linear, and/or ML models to perform cloud-based data processing); (vii) incorporate strategies (e.g., strategies to provide VDI capabilities) for remotely enhancing capabilities of the clients; (viii) provide robust security features to the clients and make sure that a minimum level of service is always provided to a user of a client; (ix) transmit the result(s) of the computing work performed (e.g., real-time business insights, equipment maintenance predictions, other actionable responses, etc.) to another IN (not shown) of the system (100) for review and/or other human interactions; (x) exchange data with other devices registered in/to the network (130) in order to, for example, participate in a collaborative workload placement (e.g., the IN may split up a request (e.g., an operation, a task, an activity, etc.) with another IN, coordinating its efforts to complete the request more efficiently than if the IN had been responsible for completing the request); (xi) provide software-defined data protection for the clients (for example, data generated for the clients may be valuable to the corresponding users, and therefore may be protected by the data protection module); (xii) provide automated data discovery, protection, management, and recovery operations for the clients; (xiii) monitor operational states of the clients; (xiv) regularly back up configuration information of the clients to the database (135); (xv) provide (e.g., via a broadcast, multicast, or unicast mechanism) information (e.g., a location identifier, the amount of available resources, etc.) associated with the IN to other INs of the system (100); (xvi) configure or control any mechanism that defines when, how, and what data to provide to the clients and/or to the database; (xvii) provide data deduplication; (xviii) orchestrate data protection through one or more GUIs; (xix) empower data owners (e.g., users of the clients) to perform self-service data backup and restore operations from their native applications; (xx) ensure compliance and satisfy different types of service level objectives (SLOs) set by an administrator/user; (xxi) increase resiliency of an organization by enabling rapid recovery or cloud disaster recovery from cyber incidents; (xxii) provide operational simplicity, agility, and flexibility for physical, virtual, and cloud-native environments; (xxiii) consolidate multiple data process or protection requests (received from, for example, clients) so that duplicative operations (which may not be useful for restoration purposes) are not generated; (xxiv) initiate multiple data process or protection operations in parallel (e.g., the IN may host multiple operations, in which each of the multiple operations may (a) manage the initiation of a respective operation and (b) operate concurrently to initiate multiple operations); and/or (xxv) manage operations of one or more clients (e.g., receiving information from the clients regarding changes in the operation of the clients) to improve their operations (e.g., improve the quality of data being generated, decrease the computing resources cost of generating data, etc.). In one or more embodiments, in order to read, write, or store data, the IN (120) may communicate with, for example, the database (135) and/or other storage devices in the system (100). Additional details of the IN (120) are described below in reference to FIG. 2.

In one or more embodiments, monitoring the operational states of the clients (e.g., 110A, 110N, etc.) may be used to determine whether it is likely that the monitoring of the scenes by the clients results in information regarding the scenes that accurately reflects the states of the scenes (e.g., a client may provide inaccurate information regarding a monitored scene). Said another way, by providing monitoring services, the IN (120) may be able to determine whether a client is malfunctioning (e.g., the operational state of a client may change due to a damage to the client, malicious action (e.g., hacking, a physical attack, etc.) by third-parties, etc.). If the client is not in the predetermined operational state (e.g., if the client is malfunctioning), the IN (120) may take action to remediate the client. Remediating the client may result in the client being placed in the predetermined operational state which improves the likelihood that monitoring of the scene by the client results in the generation of accurate information regarding the scene.

As described above, the IN (120) may be capable of providing a range of functionalities/services to the users of the clients (e.g., 110A, 110N, etc.). However, not all of the users may be allowed to receive all of the services. To manage the services provided to the users of the clients, a system (e.g., a service manager) in accordance with embodiments disclosed herein may manage the operation of a network (e.g., 130), in which the clients are operably connected to the IN. Specifically, the service manager (i) may identify services to be provided by the IN (for example, based on the number of users using the clients) and (ii) may limit communications of the clients to receive IN provided services.

For example, the priority (e.g., the user access level) of a user may be used to determine how to manage computing resources of the IN (120) to provide services to that user. As yet another example, the priority of a user may be used to identify the services that need to be provided to that user. As yet another example, the priority of a user may be used to determine how quickly communications (for the purposes of providing services in cooperation with the internal network (and its subcomponents)) are to be processed by the internal network.

Further, consider a scenario where a first user is to be treated as a normal user (e.g., a non-privileged user, a user with a user access level/tier of 4/10). In such a scenario, the user level of that user may indicate that certain ports (of the subcomponents of the network (130) corresponding to communication protocols such as the TCP, the UDP, etc.) are to be opened, other ports are to be blocked/disabled so that (i) certain services are to be provided to the user by the IN (120) (e.g., while the computing resources of the IN may be capable of providing/performing any number of remote computer-implemented services, they may be limited in providing some of the services over the network (130)) and (ii) network traffic from that user is to be afforded a normal level of quality (e.g., a normal processing rate with a limited communication bandwidth (BW)). By doing so, (i) computer-implemented services provided to the users of the clients (e.g., 110A, 110N, etc.) may be granularly configured without modifying the operation(s) of the clients and (ii) the overhead for managing the services of the clients may be reduced by not requiring modification of the operation(s) of the clients directly.

In contrast, a second user may be determined to be a high priority user (e.g., a privileged user, a user with a user access level of 9/10). In such a case, the user level of that user may indicate that more ports are to be opened than were for the first user so that (i) the IN (120) may provide more services to the second user and (ii) network traffic from that user is to be afforded a high-level of quality (e.g., a higher processing rate than the traffic from the normal user).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, operating system (OS) data, etc.), medium workloads with higher priority (e.g., VM with FS data, network data management protocol (NDMP) data, etc.), large workloads with critical priority (e.g., mission critical application data), etc.

As used herein, a "policy" is a container or other collection of information, such as a backup policy or other data protection policy, that includes, for example (but not limited to): identity of source data that is to be protected, backup schedule and retention requirements for backed up source data, identity of an SLA (or a rule) that applies to source data, identity of a target device where source data is to be stored, etc.

As used herein, the term "backup" is intended to be broad in scope. In this manner, example backups (in connection with the embodiments disclosed herein) may include (but not limited to): full backups, partial backups, clones, snapshots, incremental backups, differential backups, etc.

As used herein, a "rule" is a guideline used by an SLA component to select a particular target device (or target devices), based on the ability of the target device to meet requirements imposed by the SLA. For example, a rule may specify that an HDD having a particular performance parameter should be used as the target device. A target device selected by the SLA component may be identified as part of a backup policy or other data protection policy.

As used herein, an "SLA" between, for example, a vendor and a user may specify one or more user performance requirements (that define, for example, a target device to be chosen dynamically during, and as part of, a data protection process), for example (but not limited to): how many copies should be made of source data, latency requirements, data availability requirements, recovery point objective (RPO) requirements, recovery time objective (RTO) requirements, etc. In most cases, the user may be agnostic, for example, as to which particular target devices are used, as long as the user performance requirements are satisfied.

In one or more embodiments, data protection policies used to protect massive amounts of data may require a certain level of intelligence to infer SLAs of a user and provide ease of implementing data protection by reducing manual effort as much as possible to meet user expectations (or user demands). Further, a data protection policy may be defined and implemented to determine target device(s) that are best suited to meet user SLAs (that are defined within the policy). In some cases, user SLAs may be assigned to particular data protection policies for different types of data protection workloads.

In one or more embodiments, the wrong (or sub-optimal) selection of a target device may (i) result in generating an over-utilized or under-utilized target device and (ii) unnecessarily delay a backup (or replication) operation window.

Further, while a single IN (e.g., 120) is considered above, the term "node" includes any collection of systems or sub-systems that individually or jointly execute a set, or multiple sets, of instructions to provide one or more computer-implemented services. For example, a single IN may provide a computer-implemented service on its own (i.e., independently) while multiple other nodes may provide a second computer-implemented service cooperatively (e.g., each of the multiple other nodes may provide similar and or different services that form the cooperatively provided service).

As described above, the IN (120) may provide any quantity and any type of computer-implemented services. To provide computer-implemented services, the IN may be a heterogeneous set, including a collection of physical components/resources configured to perform operations of the IN and/or otherwise execute a collection of logical components/resources of the IN. In one or more embodiments, a resource (e.g., a measurable quantity of a compute-relevant resource type that may be requested, allocated, and/or consumed) may be (or may include), for example (but not limited to): a CPU, a GPU, a DPU, memory, a network resource, storage space (e.g., to store any type and quantity of information), storage input/output, a hardware resource set, a compute resource set (e.g., one or more processors, processor dedicated memory, etc.), a control resource set, etc.

In one or more embodiments, the IN (120) may implement a management model to manage the aforementioned computing resources in a particular manner. The management model may give rise to additional functionalities for the computing resources. For example, the management model may automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and number of management models may be implemented to provide additional functionalities using the computing resources without departing from the scope of the embodiments disclosed herein.

In one or more embodiments, resources (or computing resources) of the IN (120) may be divided into three logical resource sets: a compute resource set, a control resource set, and a hardware resource set. Different resource sets, or portions thereof, from the same or different INs may be aggregated (e.g., caused to operate as a computing device) to instantiate a composed IN having at least one resource set from each set of the three resource set model.

In one or more embodiments, a hardware resource set (e.g., of the IN (120)) may include (or specify), for example (but not limited to): a configurable CPU option (e.g., a valid/legitimate vCPU count per-IN option), a minimum user count per-IN, a maximum user count per-IN, a configurable network resource option (e.g., enabling/disabling single-root input/output virtualization (SR-IOV) for specific INs), a configurable memory option (e.g., maximum and minimum memory per-IN), a configurable GPU option (e.g., allowable scheduling policy and/or vGPU count combinations per-IN), a configurable DPU option (e.g., legitimacy of disabling inter-integrated circuit (I2C) for various INs), a configurable storage space option (e.g., a list of disk cloning technologies across all INs), a configurable storage input/output option (e.g., a list of possible file system block sizes across all target file systems), a user type (e.g., a knowledge worker, a task worker with relatively low-end compute requirements, a high-end user that requires a rich multimedia experience, etc.), a network resource related template (e.g., a 10 GB/s BW with 20 ms latency quality of service (QoS) template, a 10 GB/s BW with 10 ms latency QoS template, etc.), a DPU related template (e.g., a 1 GB/s BW vDPU with 1 GB vDPU frame buffer template, a 2 GB/s BW vDPU with 1 GB vDPU frame buffer template, etc.), a GPU related template (e.g., a depth-first vGPU with 1 GB vGPU frame buffer template, a depth-first vGPU with 2 GB vGPU frame buffer template, etc.), a storage space related template (e.g., a 40 GB SSD storage template, an 80 GB SSD storage template, etc.), a CPU related template (e.g., a 1 vCPU with 4 cores template, a 2 vCPUs with 4 cores template, etc.), a memory related template (e.g., a 4 GB DRAM template, an 8 GB DRAM template, etc.), a speed select technology configuration (e.g., enabled, disabled, etc.), a virtual NIC (vNIC) count per-IN, a wake on LAN support configuration (e.g., supported/enabled, not supported/disabled, etc.), a swap space configuration per-IN, a reserved memory configuration (e.g., as a percentage of configured memory such as 0-100%), a memory ballooning configuration (e.g., enabled, disabled, etc.), a vGPU count per-IN, a type of a vGPU scheduling policy (e.g., a "fixed share" vGPU scheduling policy, an "equal share" vGPU scheduling policy, etc.), a type of a GPU virtualization approach (e.g., graphics vendor native drivers approach such as a vGPU), a storage mode configuration (e.g., an enabled high-performance storage array mode, a disabled high-performance storage array mode, an enabled general storage (i.e., co-processor) mode, a disabled general storage mode, etc.), a backup frequency (e.g., hourly, daily, monthly, etc.), etc.

One of ordinary skill will appreciate that the IN (120) may perform other functionalities without departing from the scope of the embodiments disclosed herein.

In one or more embodiments, the IN (120) may be implemented as a physical computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the IN described throughout the application.

Alternatively, in one or more embodiments, similar to a client (e.g., 110A, 110N, etc.), the IN may also be implemented as a logical device.

In one or more embodiments, as being a trusted facility/site, the manufacturer (124) may be part of a supply chain route (that may be traversed by an enterprise product), in which the supply chain route may outline a sequence of trusted sites through which the enterprise product transitions during its lifetime.

In one or more embodiments, the manufacturer (124) may reference a trusted facility where a supplier of an enterprise product (e.g., a data protection system) may manufacture the enterprise product in part or in entirety. Manufacturing of an enterprise product may include one or more steps/stages, for example (but not limited to): steps of a developer/administrator flow of an application; manufacturing of chassis and front panel parts; subassembly of chassis parts to obtain a chassis; integration of a chassis and front panel parts to obtain a chassis enclosure; procurement of a power supply and/or cables and/or a backplane; integration of a power supply and/or cables and/or a backplane into a chassis enclosure; procurement of a baseboard and integration thereof into a chassis enclosure; procurement of one or more expansion cards and integration thereof into a chassis enclosure; procurement of one or more storage devices and integration thereof into a chassis enclosure; procurement of computer processors (e.g., CPUs, DPUs, etc.) as well as computer memory and integration thereof into a chassis enclosure to obtain a fully-assembled enterprise product; installation of an OS, zero or more software applications, and/or firmware onto a fully-assembled enterprise product to obtain a fully-integrated enterprise product; etc.

In one or more embodiments, the aforementioned enterprise product manufacturing steps may be performed across one or many manufacturers. Further, the manufacturer (124) may include functionality to service, upgrade, troubleshoot, test, package, and/or distribute various different enterprise products.

In addition, the manufacturer (124) may, e.g.: (i) act as an automated continuous integration (CI)/continuous delivery (CD) environment; (ii) act as an integration test environment so that an administrator may manage differences between the administrator's product testing activities and a user's product utilization activities for product management and development; (iii) in conjunction with the IN (120), enable the administrator to manage differences between the administrator's product testing activities and user's product utilization activities for more pinpoint product management and development; and/or (iv) in conjunction with the IN (120), enable the administrator to identify a user profile of the user more in-depth in order to provide a better user experience (to the user). One of ordinary skill will appreciate that the manufacturer (124) may perform other functionalities without departing from the scope of the embodiments disclosed herein.

In one or more embodiments, the framework (discussed above) may help an administrator of the manufacturer (124) to test, for example, a data protection system from different perspectives before deploying the data protection system to a corresponding user. For example, consider a scenario where after the data protection system is manufactured, the administrator has started retrieving telemetry data (e.g., system logs, application logs, alerts, etc.) from the data protection system to obtain useful and detailed insights (e.g., resources utilization values, types of workloads being implemented in parallel, etc.) with respect to a data protection module (hosted by the system) while migrating data from a source device to a target device.

However, in this scenario, after analyzing the telemetry data, the administrator infers/detects a failure/defect in the data protection module (e.g., the "resource balancer" component of the module was not operating as expected (was not balancing computing resources across the data protection system), where the resource balancer component internally uses a "metrics" component). Based on the detected failure and further analyzing the telemetry data, the administrator identifies the root cause of the failure is associated with "unique physical resource used" metrics. In fact, the metrics component depends on other components (e.g., a system manager, a collector, etc.) of the module to report the "unique physical resource used" metrics, indicating that the administrator has to make sure that these components are working as expected (however, the administrators is not aware of this dependency (e.g., does not know which component is reporting this value) and whether there is a problem in this domain because the administrator is not familiar with the "unique physical resource used" metrics).

At this point, the administrator starts using the framework (see e.g., FIGS. 4.1 and 4.2) to obtain/receive one or more test cases based on the root cause of the failure (e.g., "volume migration recommendation generation failed because the resource balancer could not find suitable objects with non-zero unique physical resource used metric"). To this end, the administrator sends a query (e.g., "recommend test cases with their respective identifiers that should be executed for the root cause of the failure") to the framework. Thereafter, the framework identifies four test cases (e.g., test case (TC) 13116, TC-13239, TC-13137, and TC-9884) and provides those cases as a recommendation to the administrator so that (by executing/applying the test cases) the administrator can fix the failure and continue testing the data protection system before deploying the system to the user.

In this scenario, "TC-13116" may specify "verify logical provisioned historical stats of a volume family primary delete" and may recommend taking the following steps: (i) generate a volume, (ii) generate a clone of the volume, (iii) make a REST API call to "/api/rest/space_metrics_by_volume_family" and verify the "logical_provisioned stats" displayed for clone are accurate, (iv) generate a snap of a volume, (v) make a REST API call to "/api/rest/space_metrics_by_volume_family" and verify the "logical_provisioned stats" displayed for snap are accurate, (vi) delete primary volume, and (vii) make a REST API call to "/api/rest/space_metrics_by_volume_family" and verify no stats are displayed for clone, snap, and primary.

Further, in this scenario, "TC-13239" may specify "verify logical used historical stats of a volume family primary delete" and may recommend taking the following steps: (i) generate a volume, (ii) generate a clone of the volume, (iii) make a REST API call to "/api/rest/space_metrics_by_volume_family" and verify the "logical_used stats" displayed for clone are accurate, (iv) generate a snap of a volume, (v) make a REST API call to "/api/rest/space_metrics_by_volume_family" and verify the "logical_used stats" displayed for snap are accurate, (vi) delete primary volume, and (vii) make a REST API call to "/api/rest/space_metrics_by_volume_family" and verify no stats are displayed for clone, snap, and primary.

Further, in this scenario, "TC-13137" may specify "verify logical used of a volume family with add data" and may recommend taking the following steps: (i) generate a volume, (ii) generate a clone of the volume, (iii) generate a snap of a volume, (iv) make a REST API call to "/api/rest/space_metrics_by_volume_family" and verify the "logical used" displayed for primary volume is accurate, (v) deploy a VM and execute input/output, and (vi) make a REST API call to "/api/rest/space_metrics_by_volume_family" and verify "logical_used" displayed for primary volume is updated and accurate.

Further, in this scenario, "TC-9884" may specify "verify logical provisioned of a volume family with clone" and may recommend taking the following steps: (i) generate a volume, (ii) generate a clone of the volume, and (iii) make a REST API call to "/api/rest/space_metrics_by_volume_family" and verify the stats displayed for clone are accurate.

As described above, the data protection system may hosts, at least, the data protection module. The data protection module may be a physical or logical entity, as discussed below.

In one or more embodiments, as being a physical computing device or a logical computing device, the data protection module (not shown) may include functionality to, at least: (i) provide software-defined data protection (e.g., protecting data against loss); (ii) provide automated data discovery, protection, management, and recovery operations (e.g., to reconstruct data following loss) in on-premises; (iii) provide data deduplication; (iv) orchestrate centralized data protection through its GUI (e.g., by its GUI, the module may provide users an item level view of backups); (v) empower data owners to perform self-service data backup and restore operations from their native applications; (vi) ensure compliance and satisfy different types of SLOs; (vii) enable virtualized and cloud deployments, including automated data discovery, protection, management, and recovery operations for in-cloud workloads; (viii) enable data discovery, protection, management, and recovery operations for cloud-native workloads (e.g., an application that was designed to reside in a cloud environment) across multiple cloud environments; (ix) simplify VM image backups of a VM with near-zero impact on the VM; (x) streamline data protection for applications and/or containers (e.g., Kubernetes® containers); (xi) increase resiliency of an organization by enabling rapid recovery or cloud disaster recovery from cyber incidents; (xii) provide long-term data retention (in conjunction with the database (135)); (xiii) provide dynamic NAS backup and recovery; and/or (xiv) provide operational simplicity, agility, and flexibility for physical, virtual, and cloud-native information technology (IT) environments.

One of ordinary skill will appreciate that the data protection module may perform other functionalities without departing from the scope of the embodiments disclosed herein.

In one or more embodiments, the data protection module may provide data protection (e.g., data backup, data management, data restore, etc.) services to a production engine (not shown) of the IN (120) (or any other component of the system (100)). The data protection services may initiate (e.g., instantiate, execute, etc.) generation and storage of backups (e.g., block-based backups, file-based backups (e.g., a file-based backup is a backup of a file system that has been updated, modified, and/or otherwise accessed by the production engine), etc.) in the database (135). The data protection services may also include restoration of the production engine (or any other component of the system (100)) to a restoration host (e.g., a secondary storage system, not shown) using the backups stored (temporarily or permanently) in the database (135) and in accordance with restoration procedures initiated by one or more entities in the system (100).

As being a separate computing device that coordinates backups and restorations (and either includes or communicates with a backup storage (e.g., 135) for storing a completed backup and other data), the data protection module may provide data protection services to the production engine (or any other component of the system (100)) by orchestrating (or scheduling): (i) generation of backups of the production engine (e.g., generation of backups of assets (e.g., files, folders, etc.) associated with the production engine); (ii) storage of the generated backups of the production engine in the database (135); (iii) consolidation of one or more backup requests to reduce (or to prevent) generation of backups that are not useful for restoration purposes; and/or (iv) restoration of the production engine to previous states using backups stored in the database (135). To provide the aforementioned services, the data protection module may include functionality to generate and issue instructions to any other component of the system (100). The data protection module may also generate instructions in response to data protection requests from other entities/devices.

The data protection module may generate such instructions in accordance with backup schedules that specify when backups are to be generated. In one or more embodiments, a backup schedule may lay out specific points in time for a backup process to be performed. Additionally, these backup schedules may be configured based on a user's RPO.

In one or more embodiments, the data protection module may generate and provide to the database (135) backup data, backup metadata, as well as any other data that is produced by the data protection module in the process of performing a backup based on backup policies implemented by the data protection module. The backup policies may specify a schedule in which assets associated with the production engine and/or clients (e.g., 110A, 110N, etc.) are to be backed up. The backups may take the form of either a full or incremental backup as well as any other type of backup.

For example, the data protection module may be triggered to generate a backup along with backup metadata and provide the backup and its metadata to the database (135) in response to a backup policy. Alternatively, backup, and backup metadata may be generated by the data protection module and provided to the database (135) in response to a backup request triggered by a client (e.g., 110A) or a user of the client.

As discussed above, the data protection module may restore backup metadata and backup data stored in the database (135). When the data protection module (or other equivalent component of the system (100)) receives a request for a restoration of a backup (e.g., at a later time after performing the backup), the data protection module (or the equivalent component) retrieves the metadata and data stored in the database (135) and restores the data (without reorganizing) to its original location in, for example, the IN (120). Alternatively, in one or more embodiments disclosed herein, the data in the backup may be restored to a file system located in a different IN/host than where it was originally restored as directed by a user, administrator, or other party that requested the restoration. Other methods for restoring the backup may be used and the embodiments disclosed herein are not limited to those described above.

Further, the data protection module includes functionality for generating a file system backup and a file system metadata backup associated with data of a file system (e.g., file system data), in which the file system backup may be generated by copying at least the file system data and storing the copy in the database (135). Similarly, the file system metadata backup may be generated by copying at least the metadata and storing the copy in the database (135), in which the metadata backup may be stored as files that are separate from the file system backup.

In one or more embodiments, the data protection module may obtain a status of a backup (e.g., a block-based backup (BBB)) from the database (135). The status of the BBB may specify information such as: (i) whether the BBB was successful and whether the backup was completed within a BBB window (e.g., 100% of the BBB was completed within the BBB window), or (ii) whether the BBB was unsuccessful and how much of the BBB was not completed within the BBB window (e.g., 70% of the BBB was completed and 30% of the BBB was not completed). In one or more embodiments, the BBB window may be a period of time, with a definite start and end, within which a BBB is set to be completed.

In one or more embodiments, the data protection module may include a backup monitoring service for monitoring a status of a backup (e.g., a BBB). The backup monitoring service may be a computer program that may be executed on the underlying hardware of the data protection module. The backup monitoring service may also be designed and configured to facilitate remote access to check the status of and/or manipulate locally stored data during the BBB. Further, the backup monitoring service may include functionality to control remote procedure calls (e.g., API calls) that access and manipulate any granularity of the locally stored data during the BBB.

As discussed above, the data protection module may be configured to orchestrate a data restoration process (e.g., restoration of the IN (120) to a recovery node using backups stored in the database (135)). For example, when a backup of the IN (120) is completed (at a first point-in-time) and once the production engine is failed, the data protection module may initiate a restoration process (at a second point-in-time, which is later than the first point-in-time) to restore the IN. Based on initiating the data restoration process, a user of Client A (110A) may select one or more assets to restore from the backup of the IN (120) via a GUI. In one or more embodiments, the data protection module or Client A (110A) may provide the GUI to the user.

Continuing with the discussion of the example, once the user has selected the assets via the GUI, the data protection module may make an API call to the database (135) to access the selected assets in the backup. Based on receiving the API call from the data protection module, the database (135) may allow the data protection module to access the backup. The data protection module may then read data of the selected assets from the backup. The data protection module may then restore the selected assets to the recovery host in accordance with file system metadata associated with the selected assets.

Further, the data protection module may include functionality to consolidate multiple restore requests (received from a user of a client) to prevent generation of duplicative restorations (e.g., of the IN (120)), in which preventing the generation of duplicative restorations may reduce a restoration window. In one or more embodiments, the restoration window may be a period of time, with a definite start and end, within which an asset restoration is set to be completed. Separately, the data protection module may include functionality to initiate multiple restorations in parallel. For example, the data protection module may host multiple restoration processes. Each of the multiple restoration processes may manage the initiation of a respective restoration. Each of the multiple restoration processes may operate concurrently to initiate multiple restorations.

In one or more embodiments, all, or a portion, of the components of the system (100) may be operably connected each other and/or other entities via any combination of wired and/or wireless connections. For example, the aforementioned components may be operably connected, at least in part, via the network (130). Further, all, or a portion, of the components of the system (100) may interact with one another using any combination of wired and/or wireless communication protocols.

In one or more embodiments, the network (130) may represent a (decentralized or distributed) computing network and/or fabric configured for computing resource and/or messages exchange among registered computing devices (e.g., the clients, the IN, etc.). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network (130) may be implemented using any combination of wired and/or wireless network topologies, and the network may be operably connected to the Internet or other networks. Further, the network (130) may enable interactions between, for example, the clients, the IN, the data protection module, and the database through any number and type of wired and/or wireless network protocols (e.g., TCP, UDP, IPv4, etc.).

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (130) and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time (e.g., on the order of ms or less) network traffic and non-real-time network traffic should be managed in the network (130). In one or more embodiments, the real-time network traffic may be high-priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VoIP), etc.

Turning now to the database (135), the database (135) may provide long-term, durable, high read/write throughput data storage/protection with near-infinite scale and low-cost. The database (135) may be a fully managed cloud/remote (or local) storage (e.g., pluggable storage, object storage, block storage, file system storage, data stream storage, Web servers, unstructured storage, etc.) that acts as a shared storage/memory resource that is functional to store unstructured and/or structured data. For example, the database (135) may store data (e.g., backup data; file system metadata; assets; rules and/or procedures for performing backups of the IN (120); etc.). Further, the database (135) may also occupy a portion of a physical storage/memory device or, alternatively, may span across multiple physical storage/memory devices.

In one or more embodiments, the database (135) may be implemented using physical devices that provide data storage services (e.g., storing data and providing copies of previously stored data). The devices that provide data storage services may include hardware devices and/or logical devices. For example, the database (135) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the database (135) may include a memory device (e.g., a dual in-line memory device), in which data is stored and from which copies of previously stored data are provided. As yet another example, the database (135) may include a persistent storage device (e.g., an SSD), in which data is stored and from which copies of previously stored data is provided. As yet another example, the database (135) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the database (135) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, as being a test case management tool, the database (135) may store/record unstructured and/or structured data that may include (or specify), for example (but not limited to): an identifier of a user/customer/administrator (e.g., a unique string or combination of bits associated with a particular user); a request/query received from a user/administrator (or a user's account); a geographic location (e.g., a country) associated with the user; a timestamp showing when a specific request is processed by an application; a port number (e.g., associated with a hardware component of a client (e.g., 110N)); a protocol type associated with a port number; computing resource details (including details of hardware components and/or software components) and IP address details of the IN (120) hosting an application where a specific request is processed; an identifier of an application (e.g., that is deployed by the manufacturer (124) to the database); information with respect to historical metadata (e.g., system logs, applications logs, telemetry data including past and present device usage of one or more computing devices in the system (100), etc.); computing resource details and an IP address of a client that sent a specific request (e.g., to the IN (120)); one or more points-in-time and/or one or more periods of time associated with a data recovery event; data for execution of applications/services (including IN applications and associated end-points); corpuses of annotated data used to build/generate and train processing classifiers for trained ML models; linear, non-linear, and/or ML model parameters; an identifier of a sensor; a product identifier of a client (e.g., 110A); a type of a client; historical sensor data/input (e.g., visual sensor data, audio sensor data, electromagnetic radiation sensor data, temperature sensor data, humidity sensor data, corrosion sensor data, etc., in the form of text, audio, video, touch, and/or motion) and its corresponding details; an identifier of a data item; a size of the data item; a distributed model identifier that uniquely identifies a distributed model; a user activity performed on a data item; a cumulative history of user/administrator activity records obtained over a prolonged period of time; a setting (and a version) of a mission critical application executing on the IN (120); an SLA/SLO set by a user; a data protection policy (e.g., an affinity-based backup policy) implemented by a user (e.g., to protect a local data center, to perform a rapid recovery, etc.); a configuration setting of that policy; product configuration information associated with a client; a number of each type of a set of assets protected by a data protection module; a size of each of the set of assets protected; a number of each type of a set of data protection policies implemented by a user; configuration information associated with the IN (120) (to manage security, network traffic, network access, or any other function/operation performed by the IN); a job detail of a job (e.g., a data protection job, a data restoration job, a log retention job, etc.) that has been initiated by the IN (120); a type of the job (e.g., a non-parallel processing job, a parallel processing job, an analytics job, etc.); information associated with a hardware resource set (discussed above) of the IN (120); a completion timestamp encoding a date and/or time reflective of a successful completion of a job; a time duration reflecting the length of time expended for executing and completing a job; a backup retention period associated with a data item; a status of a job (e.g., how many jobs are still active, how many jobs are completed, etc.); information regarding an administrator (e.g., a high priority trusted administrator, a low priority trusted administrator, etc.) related to an analytics job; a workflow (e.g., a policy that dictates how a workload should be configured and/or protected, such as an SQL workflow dictates how an SQL workload should be protected) set (by a user); a type of a workload that is tested/validated by an administrator per data protection policy; a practice recommended by the manufacturer (124) (e.g., a single data protection policy should not protect more than 100 assets; for a dynamic NAS, maximum one billion files can be protected per day, etc.); one or more device state paths corresponding to a device (e.g., a client); a fraud report for an invalid user; a set of SLAs (e.g., an agreement that indicates a period of time required to retain a profile of a user); information with respect to a user/customer experience; a cumulative history of approved/disapproved operation related requests (including preapproved requests) obtained over a prolonged period of time; one or more test cases (specifying, for example, "generate a volume", "check end-to-end latency in the system", "execute a workload and monitor key performance metrics of the loader", etc.) to perform, at least, end-to-end "system" level tests, component level tests, and/or functionality tests; (user provided) custom data (e.g., domain custom knowledge (specifically referring to knowledge with a correspondence(s) between text/query/request and images, mostly in the form of a product catalog/manual); a documentation that shows how the IN (120) performs against an SLO and/or an SLA; etc.

In one or more embodiments, as being telemetry data, a system log (e.g., a file that records system activities across hardware and/or software components of a client, an internal lifecycle controller log (which may be generated as a result of internal testing of a NIC), etc.) may include (or specify), for example (but not limited to): a type of an asset (e.g., a type of a workload such as an SQL database, a NAS executing on-premises, a VM executing on a multi-cloud infrastructure, etc.) that is utilized by a user; computing resource utilization data (or key performance metrics including estimates, measurements, etc.) (e.g., data related to a user's maximum, minimum, and average CPU utilizations, an amount of storage or memory resource utilized by a user, an amount of networking resource utilized by user to perform a network operation, etc.) regarding computing resources of a client (e.g., 110A); an alert that is triggered in a client (e.g., based on a failed cloud disaster recovery operation (which is initiated by a user), the client may generate a failure alert); an important keyword associated with a hardware component of a client (e.g., recommended maximum CPU operating temperature is 75° C.); a computing functionality of a microservice (e.g., Microservice A's CPU utilization is 26%, Microservice B's GPU utilization is 38%, etc.); an amount of storage or memory resource (e.g., stack memory, heap memory, cache memory, etc.) utilized by a microservice (e.g., executing on a client); a certain file operation performed by a microservice; an amount of networking resource utilized by a microservice to perform a network operation (e.g., to publish and coordinate inter-process communications); an amount of bare metal communications executed by a microservice (e.g., input/output (I/O) operations executed by the microservice per second); a quantity of threads (e.g., a term indicating the quantity of operations that may be handled by a processor at once) utilized by a process that is executed by a microservice; an identifier of a client's manufacturer; media access control (MAC) information of a client; an amount of bare metal communication executed by a client (e.g., I/O operations executed by a client per second); etc.

In one or more embodiments, an alert (e.g., a predictive alert, a proactive alert, a technical alert, etc.) may be defined by a manufacturer (e.g., 124) of a corresponding client (e.g., 110A), by an administrator, by another entity, or any combination thereof. In one or more embodiments, an alert may specify, for example (but not limited to): a medium-level of CPU overheating is detected, a recommended maximum CPU operating temperature is exceeded, etc. Further, an alert may be defined based on a data protection policy.

In one or more embodiments, an important keyword may be defined by a manufacturer (e.g., 124) of a corresponding client (e.g., 110A), by a technical support specialist, by the administrator, by another entity, or any combination thereof. In one or more embodiments, an important keyword may be a specific technical term or a manufacturer specific term that is used in a system log.

In one or more embodiments, as being telemetry data, an application log may include (or specify), for example (but not limited to): a type of a file system (e.g., a new technology file system (NTFS), a resilient file system (ReFS), etc.); a product identifier of an application; a version of an operating system that an application is executing on; a display resolution configuration of a client; a health status of an application (e.g., healthy, unhealthy, etc.); warnings and/or errors reported for an application; a language setting of an OS; a setting of an application (e.g., a current setting that is being applied to an application either by a user or by default, in which the setting may be a font option that is selected by the user, a background setting of the application, etc.); a version of an application; a warning reported for an application (e.g., unknown software exception (0xc00d) occurred in the application at location 0x0007d); a version of an OS; a type of an OS (e.g., a workstation OS); an amount of storage used by an application; a size of an application (size (e.g., 5 Megabytes (5 MB), 5 GB, etc.) of an application may specify how much storage space is being consumed by that application); a type of an application (a type of an application may specify that, for example, the application is a support, deployment, or recycling application); a priority of an application (e.g., a priority class of an application, described below); active and inactive session counts; etc.

As used herein, "unhealthy" may refer to a compromised health state (e.g., an unhealthy state), indicating a corresponding entity (e.g., a hardware component, a client, an application, etc.) has already or is likely to, in the future, be no longer able to provide the services that the entity has previously provided. The health state determination may be made via any method based on the aggregated health information without departing from the scope of the embodiments disclosed herein.

In one or more embodiments, a priority class may be based on, for example (but not limited to): an application's tolerance for downtime, a size of an application, a relationship (e.g., a dependency) of an application to other applications, etc. Applications may be classified based on each application's tolerance for downtime. For example, based on the classification, an application may be assigned to one of three classes such as Class I, Class II, and Class III. A "Class I" application may be an application that cannot tolerate downtime. A "Class II" application may be an application that can tolerate a period of downtime (e.g., an hour or other period of time determined by an administrator or a user). A "Class III" application may be an application that can tolerate any amount of downtime.

In one or more embodiments, metadata (e.g., system logs, application logs, etc.) may be obtained (or dynamically fetched) as they become available (e.g., with no user manual intervention), or by the analyzer (e.g., 202, FIG. 2) polling a corresponding client (e.g., 110A) (by making schedule-driven/periodic API calls to the client without affecting the client's ongoing production workloads) for newer metadata. Based on receiving the API calls from the analyzer, the client may allow the analyzer to obtain the metadata.

In one or more embodiments, the metadata may be obtained (or streamed) continuously as they generated, or they may be obtained in batches, for example, in scenarios where (i) the analyzer (e.g., 202, FIG. 2) receives a metadata analysis request (or a heath check request for a client), (ii) another IN of the system (100) accumulates the metadata and provides them to the analyzer at fixed time intervals, or (iii) the database (135) stores the metadata and notify the analyzer to access the metadata from the database. In one or more embodiments, metadata may be access-protected for a transmission from a corresponding client (e.g., 110A) to the analyzer (e.g., 202, FIG. 2), e.g., using encryption.

While the unstructured and/or structured data are illustrated as separate data structures and have been discussed as including a limited amount of specific information, any of the aforementioned data structures may be divided into any number of data structures, combined with any number of other data structures, and/or may include additional, less, and/or different information without departing from the scope of the embodiments disclosed herein.

Additionally, while illustrated as being stored in the database, (135) any of the aforementioned data structures may be stored in different locations (e.g., in persistent storage of other computing devices) and/or spanned across any number of computing devices without departing from the scope of the embodiments disclosed herein.

In one or more embodiments, the unstructured and/or structured data may be updated (automatically) by third-party systems (e.g., platforms, marketplaces, etc.) (provided by the manufacturer (124)) and/or by the administrators based on, for example, newer (e.g., updated) versions of external information. The unstructured and/or structured data may also be updated when, for example (but not limited to): newer system logs are received, a state of the IN (120) is changed, etc.

In the embodiments of the present disclosure, the database (135) is demonstrated as a separate entity from the IN (120); however, embodiments disclosed herein are not limited as such. The database (135) may be demonstrated as a part of the IN (e.g., as deployed to the IN (120)).

While the database (135) has been illustrated and described as including a limited number and type of data, the database (135) may store additional, less, and/or different data without departing from the scope of the embodiments disclosed herein. One of ordinary skill will appreciate that the database (135) may perform other functionalities without departing from the scope of the embodiments disclosed herein.

While FIG. 1 shows a configuration of components, other system configurations may be used without departing from the scope of the embodiments disclosed herein.

Figure 2:
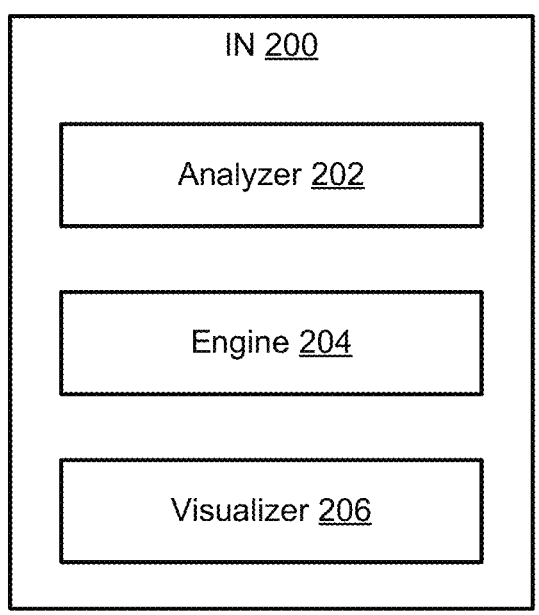
FIG. 2 shows a diagram of an infrastructure node (IN) in accordance with one or more embodiments disclosed herein.

Turning now to FIG. 2, FIG. 2 shows a diagram of an IN (200) in accordance with one or more embodiments disclosed herein. The IN (200) may be an example of the IN discussed above in reference to FIG. 1. The IN (200) includes the analyzer (202), the engine (204), and the visualizer (206). The IN (200) may include additional, fewer, and/or different components without departing from the scope of the embodiments disclosed herein. Each component may be operably connected to any of the other component via any combination of wired and/or wireless connections. Each component illustrated in FIG. 2 is discussed below.

In one or more embodiments, the analyzer (202) may include functionality to, e.g.: (i) receive/obtain one or more test cases and their corresponding descriptions (discussed below) from the database (e.g., 135, FIG. 1); (ii) (if necessary) obtain one or more "relevant" documents (discussed below) that are associated with the test cases; (iii) by employing a set of linear, non-linear, and/or ML models, analyze the test cases, descriptions, and "relevant" documents to generate reference documents (discussed below); (iv) in conjunction with the engine (204), transform the reference documents into one or more embedding vectors; (v) store the embedding vectors to a vector database (not shown); (vi) in conjunction with the visualizer (206), initiate notification of an administrator about a completed data preparation; (vi) receive a query from the visualizer (206) that is sent by the administrator; (vii) by employing a set of linear, non-linear, and/or ML models, analyze the query to infer length of the query; (viii) based on (vii), make a determination as to whether the query's length is greater than input length of a test case recommendation model (TCRM); (ix) based on (viii) and by employing a summarizer model, summarize the query to make the query's length suitable for the TCRM (employed by the engine (204)); (x) transform the query into one or more embedding vectors; (xi) provide the query to the engine (204) (for further processing); (xii) using the embedding vectors generated in (x) and in conjunction with the engine (204), perform a search for the most matching asset(s) in the vector database; and/or (xiii) provide the most matching assets to the engine (204).

Further, the analyzer (202) may include functionality to, e.g.: (i) receive/obtain telemetry data (e.g., metadata, computing resource utilization data (or key performance metrics) of hardware and/or software components, etc.) from a computing device (e.g., a client (e.g., 110A, FIG. 1), a device that is planned to be deployed to a user, etc.); (ii) use parameters/details available in the telemetry data in order to, at least, (a) trace a specific request through a distributed system (e.g., 100, FIG. 1), (b) identify potential errors (e.g., performance issues) occurred while processing the specific request (e.g., which application was down while processing the specific request, what caused that application to went down, etc.), (c) trace requests that display high-latency across all applications (e.g., microservices), (d) in conjunction with the engine (204), reduce mean time to troubleshooting performance issues, (e) in conjunction with the engine (204), get immediate root cause identification of every application impact, and (f) improve user experience by re-establishing end-to-end interoperability; (iii) based on (ii), infer dependencies and connectivity among applications executing on the system (e.g., which applications are working together, which ports are open, etc.); (iv) monitor performance (e.g., a health status) of the computing device; (v) based on (iv) and for each hardware or software component (of the computing device), derive a continuous average resource utilization value with respect to each computing resource; (vi) based on (iv) and for each hardware or software component (of the computing device), derive minimum and maximum resource utilization values with respect to each computing resource; (vii) identify health of each component based on average, minimum, and maximum resource utilization values; (viii) based on (vii), automatically react and generate alerts if one of the predetermined maximum resource utilization value thresholds is exceeded; and/or (ix) provide identified health of each component (and, indirectly, health of the computing device) and generated alerts (if any) to other entities (e.g., administrators) in order to manage the health of the computing device.

In one or more embodiments, a corresponding description (or information about a test case (e.g., a test case description)) (which may be provided by the TCRM while providing a recommendation to a corresponding administrator (or, after receiving a corresponding test case identifier, the administrator may check the descriptions from the database (e.g., 135, FIG. 1))) may include (or specify), for example (but not limited to): a description/definition of steps specified in a specific test case (e.g., "Step1: Generate a volume", "Step2: Generate a clone of the volume", etc.), a sequence of the steps that needs to be followed, an identifier (or a model name) of a component/product (to indicate which component can be tested by the test case), an identifier of the test case, a reference (or a link) to a "relevant" document, a purpose of the test case, how to execute the test case, a type and a size of a workload that needs to be utilized while executing the test case, an SLA/SLO that needs to be set before executing the test case, a data protection policy that needs to be implemented while executing the test case, a deployment configuration that needs to be set before executing the test case, etc.

In one or more embodiments, a reference document may include, at least, a dataset and metadata. In one or more embodiments, the dataset may include (or specify), for example (but not limited to): information/detail specified in a test case description, an identifier of a test case, etc.

In one or more embodiments, metadata may include (or specify), for example (but not limited to): material information of a component (e.g., that needs to be tested), shape information of the component, surface treatment information of the component, a size of the component, usage description of the component, a minimum release version of an application that needs to be installed on a computing device in order to implement a test case on the computing device, a component area/field of the component that needs to be tested on the computing device by implementing a test case, test priority information associated with an operation that needs to be tested on the computing device before shipping the computing device to a user/customer, etc.

In one or more embodiments, a "relevant" document may include (or specify), for example (but not limited to): a feature specific documentation (that includes one or more feature descriptions for the feature), a user guide of a computing device, a technical document, a feature change document for a particular feature, a knowledge base article, a solution (or a workaround) document (e.g., for a previously reported hardware component failure), a device release note, a community forum question, an answer to that question, information specifying how to implement a test case on a computing device, a technical support history documentation of a user, a port's user guide, a port's release note, a catalog file of an application upgrade, details of a compatible OS version for an application upgrade to be installed, an application upgrade sequence, one or more lists that specify which computer-implemented services should be provided to which user (depending on a user access level of a user), etc.

In one or more embodiments, a test case description may not provide enough information to the TCRM to recommend a test case. To resolve this issue, a "relevant" document may be useful to support the TCRM (in terms of data input) while recommending a test case because, comparing to the test case description, the "relevant" document may provide more in-depth information with respect to a test case (e.g., how each step of a test case operates).

In one or more embodiments, the analyzer (202) may implement a single modality model (or a single modality (text) embedding transform model) to transform, for example, a reference document into one or more "text" embedding vectors. To this end, (i) the reference document is made semantically searchable and (ii) the TCRM is enabled to provide one or more test cases (by recommending them).

Further, administrator-initiated searches may need to have a certain level of tolerance for a given text input. For example, if an administrator queries "cross-shaped screw and made by inox" and a corresponding product catalog contains "T-shaped screw, material: Stainless Steel" this should be considered as a match. Therefore, a text portion of a reference document may need to be semantically indexed for search purposes (e.g., to optimize queries executed by an administrator, to allow the administrator to efficiently search for specific data items for a better experience, to provide powerful data search (and/or retrieval) capabilities to corresponding entities, etc.). Said another way, one or more text embedding vectors (e.g., that are generated from a reference document) may be stored in the vector database and indexed, for example, to optimize an Approximate Nearest Neighbor (ANN) search/query performed by the analyzer (202).

In most cases, a pre-trained model (e.g., a single modality (text) embedding transform model) may represent data as one or more embeddings (or embedding vectors). These vectors may serve as the pre-trained model's semantic understanding of the data. By expressing various different data as such embedding vectors, one may compare their semantic similarities by calculating the distance among these vectors (typically using cosine similarity). The functionality of the vector database (e.g., FAISS) may support the aforementioned approach by efficiently facilitating one or more ANNs through storing large-scale vectors and optimizing their indexing, through techniques such as Hierarchical Navigable Small Worlds (HNSWs).

As used herein, an "embedding" is an ordered collection of numeric values that represents an input in a particular embedding space. For example, an embedding may be a vector of floating point or other numeric values that has a fixed dimensionality.

In one or more embodiments, because the required understanding is only for "textual" data (e.g., the text in a reference document, an administrator's query text, etc.), the analyzer (202) may implement a single modality embedding process (via a single modality (text) embedding transform model). Further, during implementation, two text items (processed through the single modality embedding process) may be characterized by cosine similarity to denote semantic proximity between them.

One of ordinary skill will appreciate that the analyzer (202) may perform other functionalities without departing from the scope of the embodiments disclosed herein. The analyzer (202) may be implemented using hardware, software, or any combination thereof.

In one or more embodiments, the engine (204) may include functionality to, e.g.: (i) receive/obtain the most matching assets from the analyzer (202); (ii) by employing the TCRM (e.g., an LLM that can (a) perform question answering tasks using Retrieval Augmented Generation (RAG), and (b) interface with the vector database via a question answering chain/framework (e.g., LangChain)), analyze a query (sent by an administrator) and the most matching assets to generate a recommendation; (iii) based on (ii), make a determination as to whether a recommendation is generated; (iv) based on (iii), provide the recommendation to the visualizer (206) (e.g., recommend one or more test cases to be executed on a computing device based on a feature change or a root cause analysis of a detected failure on the device); (v) based on (iii), generate an alert to indicate that no recommendation is generated; and/or (vi) based on (v), provide the alert to the visualizer (206).

In one or more embodiments, the question answering chain may be used to ingest data (e.g., the most matching assets (provided by the analyzer (202))) in the TCRM. In one or more embodiments, the question answering chain may be a wrapper on top of the TCRM that enables the TCRM to perform, at least, the aforementioned functionalities.

In one or more embodiments, if the models that are used by the analyzer (202) and the engine (204) are not operating properly (e.g., are not providing the above-discussed functionalities), the models may be re-trained using any form of training data and/or the models may be updated periodically as there are improvements in the models (e.g., the models are trained using more appropriate training data).

In one or more embodiments, the engine (204) may initiate, for example, displaying of a recommendation or an alert (indicating no recommendation is generated) to an administrator via the visualizer (206) (e.g., via a GUI, an API, a programmatic interface, and/or a communication channel of the visualizer). In one or more embodiments, for example, (i) each data item (e.g., a recommendation, test case identifiers specified in the recommendation, test case descriptions specified in the recommendation, an engine generated alert, etc.) may be displayed (e.g., highlighted, visually indicated, etc.) with a different color (e.g., red color tones may represent information associated with the alert, green color tones may represent information associated with the recommendation, etc.), and (ii) one or more useful insights with respect to recommended test cases may be displayed in a separate window(s) on the visualizer (206) to assist the administrator while performing a recommended test case on a corresponding computing device (e.g., for a better administrator experience, to help the administrator with respect to understanding the benefits and trade-offs of the recommended test case, etc.).

Further, the visualizer (206) may include functionality to, e.g.: (i) obtain (or receive) data (e.g., any type and/or quantity of input) from any source (e.g., a user via a client (e.g., 110A, FIG. 1), the engine (204), etc.) (and, if necessary, aggregate the data); (ii) based on (i) and by employing a set of linear, non-linear, and/or ML models, analyze, for example, a query to derive additional data; (iii) encompass hardware and/or software components and functionalities provided by the IN (200) to operate as a service over the network (e.g., 130, FIG. 1) so that the visualizer (206) may be used externally; (iv) employ a set of subroutine definitions, protocols, and/or hardware/software components for enabling/facilitating communications between, for example, the engine (204) and external entities (e.g., clients, administrators, etc.) such that the external entities may perform data item search and/or retrieval (with minimum amount of latency (e.g., with high-throughput and sub-ms latency)); (v) by generating one or more visual elements, allow an administrator to, at least, interact with a user of a corresponding client; (vi) receive a customer/user profile of a customer/user and display the customer profile to an administrator (e.g., for monitoring and/or performance evaluation); (vii) concurrently display one or more separate windows on, for example, its GUI; and/or (viii) generate visualizations of methods illustrated in FIGS. 3-4.2.

One of ordinary skill will appreciate that the analyzer (206) may perform other functionalities without departing from the scope of the embodiments disclosed herein. The analyzer (206) may be implemented using hardware, software, or any combination thereof.

One of ordinary skill will appreciate that the engine (204) may perform other functionalities without departing from the scope of the embodiments disclosed herein. The engine (204) may be implemented using hardware, software, or any combination thereof.

In one or more embodiments, the analyzer (202), the engine (204), and the visualizer (206) may be utilized in isolation and/or in combination to provide the above-discussed functionalities. These functionalities may be invoked using any communication model including, for example, message passing, state sharing, memory sharing, etc.

Figure 3:
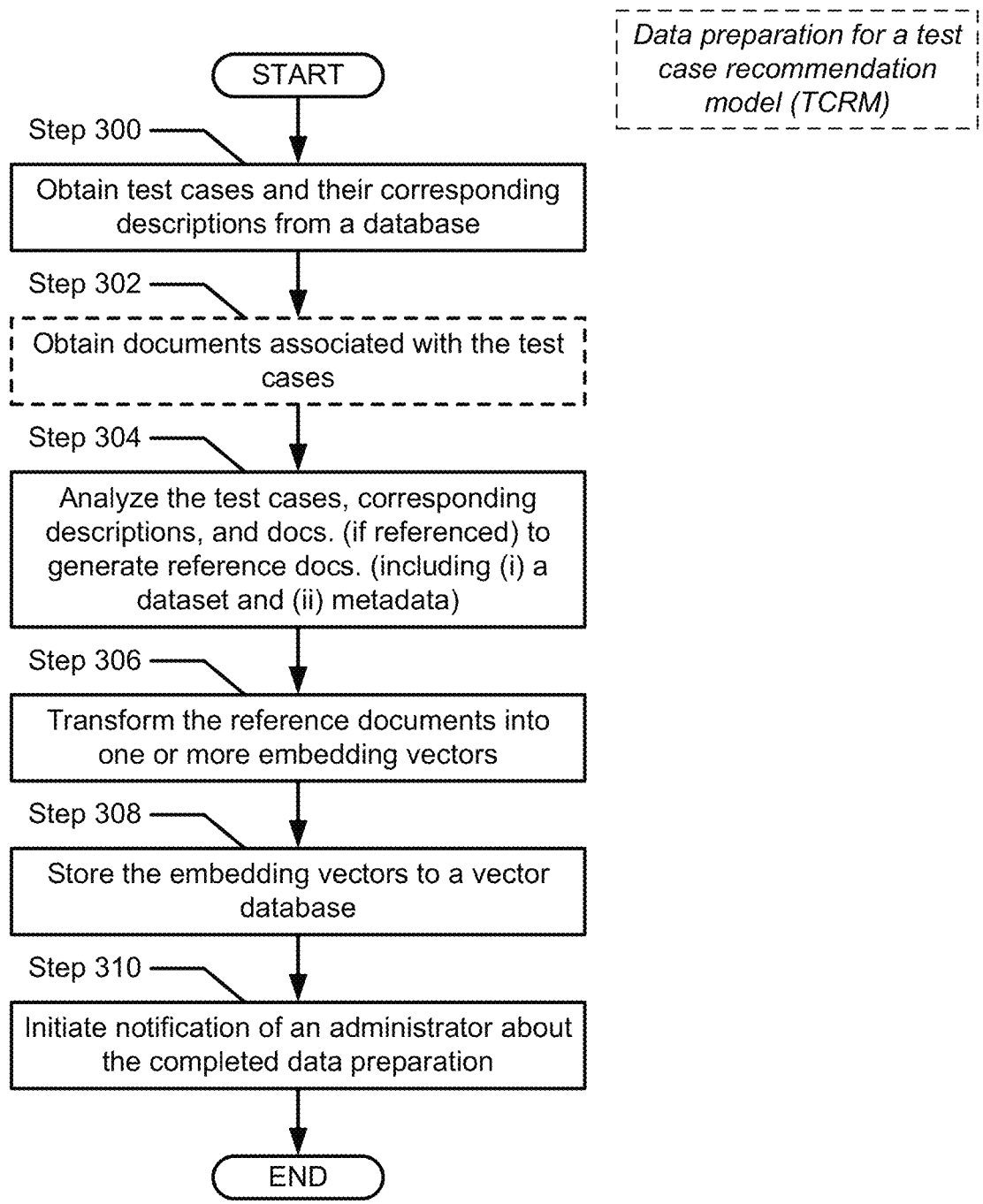
FIG. 3 shows a method for data preparation in accordance with one or more embodiments disclosed herein.

FIG. 3 shows a method for data preparation (for the TCRM) in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 3, the method shown in FIG. 3 may be executed by, for example, the above-discussed analyzer (e.g., 202, FIG. 2). Other components of the system (100) illustrated in FIG. 1 may also execute all or part of the method shown in FIG. 3 without departing from the scope of the embodiments disclosed herein.

In Step 300, the analyzer receives a request from a requesting entity (e.g., an administrator via an administrator terminal, an application, etc.) that wants to perform data preparation for the TCRM.

In response to receiving the request, as part of that request, and/or in any other manner (e.g., before initiating any computation with respect to the request), the analyzer invokes the database (e.g., 135, FIG. 1) to communicate with the database. After receiving the database's confirmation, the analyzer obtains one or more test cases and their corresponding descriptions (e.g., test case descriptions) from the database. In one or more embodiments, the aforementioned data may be obtained continuously or at regular intervals (e.g., every 5 hours) (without affecting production workloads of the database and the analyzer). Further, the aforementioned data may be access-protected for the transmission from, for example, the database to the analyzer, e.g., using encryption.

In one or more embodiments, the aforementioned data may be obtained as it becomes available or by the analyzer polling the database (via one or more API calls) for newer information. For example, based on receiving an API call from the analyzer, the database may allow the analyzer to obtain newer information. Details of the test case descriptions are described above in reference to FIG. 2.

In Step 302, if a test case description (obtained in Step 300) is specifying a reference (or a link) to one or more "relevant" documents (that is why this step is illustrated with dashed lines), the analyzer obtains the "relevant" documents from a corresponding entity. Details of the "relevant" documents are described above in reference to FIG. 2.

In Step 304, by employing a set of linear, non-linear, and/or ML models, the analyzer proactively analyzes the test cases and test case descriptions (obtained in Step 300), and "relevant" documents ((if referenced) obtained in Step 302) to generate one or more reference documents (including, at least, a dataset and metadata). In one or more embodiments, the analyzer may store (temporarily or permanently) the reference documents to the database. Details of the dataset and metadata are described above in reference to FIG. 2.

In one or more embodiments, before moving to Step 306, the analyzer may clean each reference document to obtain a cleaned reference document. In one or more embodiments, cleaning a reference document may include identifying and removing repetitive information/data from the reference document. In Step 306, by employing the single modality embedding transform model (see FIG. 2), the analyzer transforms the reference documents into one or more embedding vectors (e.g., text embedding vectors).

In most cases, to consider data in an LLM involved application, one may need to include the data in an input prompt before sending the prompt to an LLM API (e.g., the question answering chain). To manage the data more effectively, the data may be transformed into one or more embedding vectors and stored in a vector database. These vectors may then be retrieved based on the prompt, and the resulting data may be combined with the prompt to form a newer prompt (e.g., to subsequently invoke the LLM API in order to obtain responses that consider the data). The aforementioned approach may fall under the domain of prompt engineering. More specifically, the aforementioned approach may be categorized as the RAG approach, which uses precise information obtained through retrieval to enhance the outcome of a generative model.

To this end, in Step 308, the analyzer may store (temporarily or permanently) the embedding vectors to the vector database. In one or more embodiments, the embedding vectors stored in the vector database may need to be re-organized to build a newer index or update an existing index based on (a) the assets/objects identified by a newer retrieval query/job or (b) an another asset that the administrator requested to obtain/infer from existing reference documents.

In Step 310, after storing the embedding vectors, the analyzer initiates notification of the administrator about the completed data preparation. The notification may include, for example (but not limited to): for what purpose the data preparation process is conducted, the amount of time that has been spent while performing the data preparation process, etc.

In one or more embodiments, the notification may also indicate whether the data preparation process was completed within the predetermined window, or whether the process was completed after exceeding the predetermined window. The notification may be displayed on a GUI of the visualizer (e.g., 206, FIG. 2). In one or more embodiments, the method may end following Step 310.

FIGS. 4.1 and 4.2 show a method for generating a recommendation by employing the TCRM in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 4.1, the method shown in FIG. 4.1 may be executed by, for example, the above-discussed visualizer and analyzer. Other components of the system (100) illustrated in FIG. 1 may also execute all or part of the method shown in FIG. 4.1 without departing from the scope of the embodiments disclosed herein.

In Step 400, the visualizer receives a query (or a query text as input) about a test case recommendation from a requesting entity (e.g., the administrator via the administrator terminal, an application, etc.), in which the query (e.g., "recommend test cases with their respective identifiers that should be executed for a critical fan failure (which is the root cause of a CPU failure) detected in a computing device (of a user)", "recommend test cases with their respective identifiers that should be executed to test Feature RT on a NIC of the computing device before shipping the device", etc.) may include/specify information with respect to, for example (but not limited to): an identifier of the administrator who initiated the query, an identifier of a computing device used by the administrator (while sending the query), etc.

In Step 402, in response to receiving the query, as part of that query, and/or in any other manner (e.g., before initiating any computation with respect to the query), the visualizer sends the query to the analyzer. In Step 404, (i) upon receiving the query (including the information provided with the query) and (ii) by employing a set of linear, non-linear, and/or ML models, the analyzer proactively analyzes the query to infer length of the query.

In Step 406, based on Step 404, the analyzer makes a first determination (in real-time or near real-time) as to whether the query's length is greater than input context length (or input length) of the TCRM. Accordingly, in one or more embodiments, if the result of the first determination is YES, the method proceeds to Step 408. If the result of the first determination is NO, the method alternatively proceeds to Step 410.

In Step 408, as a result of the first determination in Step 406 being YES and by employing a summarizer model, the analyzer summarizes the query to make the query's length suitable for the TCRM (e.g., less than or equal to the input length of the TCRM). The method may then proceed to Step 410. In Step 410, as a result of the first determination in Step 406 being NO (or after Step 408) and by employing the single modality embedding transform model, the analyzer transforms the query into an embedding vector (e.g., a text embedding vector). In Step 412, analyzer provides the query to an engine (e.g., 204, FIG. 2).

Turning now to FIG. 4.2, the method shown in FIG. 4.2 may be executed by, for example, the above-discussed visualizer, analyzer, and engine. Other components of the system (100) illustrated in FIG. 1 may also execute all or part of the method shown in FIG. 4.2 without departing from the scope of the embodiments disclosed herein.

In Step 414, based on the query (obtained in Step 412 of FIG. 4.1) and using the text embedding vector (obtained in Step 410 of FIG. 4.1), the analyzer (in conjunction with the engine) communicates with the vector database (or invokes the vector database) to perform an ANN search (e.g., a similarity search, a semantic search, etc.) for the most matching/relevant asset(s) (or the most matching embedding vector(s) associated with test cases relevant to the query) in the vector database (to allow for recommendation generation).

In Step 416, the analyzer sends/provides the most matching assets to the engine. In Step 418, (i) upon receiving the most matching assets and (ii) by employing the TCRM, the analyzer analyzes the query and the most matching assets to attempt to generate a recommendation (that would be the most relevant for the query). In one or more embodiments, the TCRM may keep a corresponding chat history (with the administrator) in memory and may be asked follow-up questions to refine the recommendation (as needed).

In Step 420, based on Step 418, the engine makes a second determination (in real-time or near real-time) as to whether a recommendation is generated. Accordingly, in one or more embodiments, if the result of the second determination is YES, the method proceeds to Step 422. If the result of the second determination is NO, the method alternatively proceeds to Step 426.

In Step 422, as a result of the second determination in Step 420 being YES, the engine provides the recommendation to the visualizer. In Step 424, the visualizer initiates displaying of the recommendation to the administrator in response to the query (received in Step 400 of FIG. 4.1). In one or more embodiments, the recommendation may be displayed/presented on a GUI of the visualizer, in which different portions of the recommendation may be highlighted for a better experience.

In one or more embodiments, as being a preventive (and proactive) action, the recommendation may include (or specify), for example (but not limited to): one or more test cases (and their identifiers) to be executed (e.g., by using an identifier of a recommended test case, the administrator may obtain more information with respect to the test case from the database), how many test cases need to be performed (on the corresponding computing device), a type of each test case, what source/workload should be considered while executing each test case, etc. In one or more embodiments, with the provided recommendation, the administrator may make better informed decisions with respect to mitigating potential risks associated with the computing device.

In one or more embodiments, the engine may include a recommendation monitoring service to monitor whether a provided recommendation is considered by the administrator. The recommendation monitoring service may be a computer program that may be executed on the underlying hardware of the IN (e.g., 200, FIG. 2). The recommendation monitoring service may be designed and configured to facilitate remote access to check the overall state of the administrator (e.g., satisfactory after implementing the provided recommendation, still unsatisfactory even after executing the provided recommendation, etc.). Based on the monitoring, if the overall state of the administrator is still unsatisfactory (even after executing the provided recommendation), the engine (via the TCRM) may provide another recommendation (via the visualizer) to the administrator.

In one or more embodiments, the method may end following Step 424.

In Step 426, as a result of the second determination in Step 420 being NO, the engine automatically reacts and generates an alert to indicate/report that no recommendation is generated. In one or more embodiments, the alert may further indicate that there is an identified test case gap in the database (e.g., one or more test cases are missing in the database). In Step 428, the engine provides the alert to the visualizer.

In Step 430, the visualizer initiates displaying of the alert to the administrator in response to the query (received in Step 400 of FIG. 4.1). In one or more embodiments, the alert may be displayed/presented on a GUI of the visualizer, in which different portions of the alert may be highlighted for a better experience.

Further, upon receiving the alert, the administrator may generate/develop a newer test case to overcome the identified test case gap and upload the newer test case to the database. In one or more embodiments, the method may end following Step 430.

Turning now to FIG. 5, FIG. 5 shows a diagram of a computing device in accordance with one or more embodiments disclosed herein.

In one or more embodiments disclosed herein, the computing device (500) may include one or more computer processors (502), non-persistent storage (504) (e.g., volatile memory, such as RAM, cache memory), persistent storage (506) (e.g., a non-transitory computer readable medium, a hard disk, an optical drive such as a CD drive or a DVD drive, a Flash memory, etc.), a communication interface (512) (e.g., Bluetooth interface, infrared interface, network interface, optical interface, etc.), an input device(s) (510), an output device(s) (508), and numerous other elements (not shown) and functionalities. Each of these components is described below.

In one or more embodiments, the computer processor(s) (502) may be an integrated circuit for processing instructions. For example, the computer processor(s) (502) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (e.g., a LAN, a WAN, Internet, mobile network, etc.) and/or to another device, such as another computing device.

In one or more embodiments, the computing device (500) may include one or more output devices (508), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments disclosed herein may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for recommending a test case (TC), the method comprising:
   obtaining, by an analyzer, TCs and information about the TCs;
   obtaining, by the analyzer, a document that is associated with the TCs;
   analyzing, by the analyzer, the TCs, the information, and the document to generate a reference document (RD), wherein the RD comprises a dataset and metadata;
   transforming, by the analyzer and via an embedding transform model, the RD into a first embedding vector (EV), wherein the first EV is stored in a vector database;
   after storing the first EV:
      receiving, by a visualizer, a query about a recommendation from an administrator, wherein the visualizer sends the query to the analyzer;
      analyzing, by the analyzer, the query to infer a length of the query;
      making, by the analyzer, a first determination that the length of the query is greater than an input length of a test case recommendation model (TCRM);
      based on the first determination, employing, by the analyzer, a summarizer model to obtain a summarized query, wherein a length of the summarized query is less than or equal to the input length of the TCRM;
      transforming, by the analyzer and via the embedding transform model, the summarized query into a second EV, wherein the summarized query is provided to an engine;
      performing, by the analyzer and using the second EV, a search for a most matching asset in the vector database, wherein the most matching asset is sent to the engine;
      analyzing, by the engine and employing the TCRM, the summarized query and the most matching asset to generate the recommendation;
      making, by the engine, a second determination that the recommendation is generated;
      based on the second determination, by the engine, sending the recommendation to the visualizer; and
      initiating, by the visualizer, displaying of the recommendation to the administrator.

2. The method of claim 1, wherein the document comprises at least one selected from a group consisting of a knowledge base article, a user guide of a computing device, a device release note, a community forum question, an answer to the question, and information specifying how to implement a second TC on the computing device.

3. The method of claim 1, wherein the TCRM is a large language model, and wherein the search is an approximate nearest neighbor search.

4. The method of claim 1, wherein the recommendation specifies at least a second TC, wherein the administrator implements the second TC to test a computing resource configuration on a computing device before deploying the computing device to a customer.

5. The method of claim 1, wherein the recommendation specifies at least a second TC, wherein the administrator implements the second TC to validate a failure associated with a computing device that is deployed to a customer, wherein the customer has reported the failure after initiating a data migration process from the computing device.

6. The method of claim 1, wherein the dataset comprises at least an identifier of a second TC and a test step description associated with the second TC.

7. The method of claim 1, wherein the metadata comprises at least one selected from a group consisting of a minimum release version of an application that needs to be installed on a computing device in order to implement a second TC on the computing device, a component area of a component that needs to be tested on the computing device by implementing a third TC, and test priority information associated with an operation that needs to be tested on the computing device before shipping the computing device to a customer.

8. The method of claim 1, wherein the first EV is a first text EV, wherein the second EV is a second test EV.

9. A method for recommending a test case (TC), the method comprising:
   obtaining, by an analyzer, TCs and information about the TCs;
   obtaining, by the analyzer, a document that is associated with the TCs;
   analyzing, by the analyzer, the TCs, the information, and the document to generate a reference document (RD), wherein the RD comprises a dataset and metadata;
   transforming, by the analyzer and via an embedding transform model, the RD into a first embedding vector (EV), wherein the first EV is stored in a vector database;
   after storing the first EV:
      receiving, by a visualizer, a query about a recommendation from an administrator, wherein the visualizer sends the query to the analyzer;
      analyzing, by the analyzer, the query to infer a length of the query;
      making, by the analyzer, a first determination that the length of the query is greater than an input length of a test case recommendation model (TCRM);
      based on the first determination, employing, by the analyzer, a summarizer model to obtain a summarized query, wherein a length of the summarized query is less than or equal to the input length of the TCRM;
      transforming, by the analyzer and via the embedding transform model, the summarized query into a second EV, wherein the summarized query is provided to an engine;
      performing, by the analyzer and using the second EV, a search for a most matching asset in the vector database, wherein the most matching asset is sent to the engine;
      attempting to generate the recommendation by analyzing, via the engine and employing the TCRM, the summarized query and the most matching asset;
      making, by the engine, a second determination that the recommendation is not generated;
      based on the second determination, generating, by the engine, an alert specifying at least no recommendation is generated, wherein the alert is provided to the visualizer; and initiating, by the visualizer, displaying of the alert to the administrator.

10. The method of claim 9, wherein the document comprises at least one selected from a group consisting of a knowledge base article, a user guide of a computing device, a device release note, a community forum question, an answer to the question, and information specifying how to implement a second TC on the computing device.

11. The method of claim 9, wherein the TCRM is a large language model, wherein the search is an approximate nearest neighbor search.

12. The method of claim 9,
wherein the alert further specifies an identified TC gap in a database comprising the TCs and the information, and
wherein, based on the alert, a second TC is obtained from the administrator to overcome the identified TC gap and uploaded the second TC to the database.

13. The method of claim 9, wherein the dataset comprises at least an identifier of a second TC and a test step description associated with the second TC.

14. The method of claim 9, wherein the metadata comprises at least one selected from a group consisting of a minimum release version of an application that needs to be installed on a computing device in order to implement a second TC on the computing device, a component area of a component that needs to be tested on the computing device by implementing a third TC, and test priority information associated with an operation that needs to be tested on the computing device before shipping the computing device to a customer.

15. The method of claim 9, wherein the first EV is a first text EV, wherein the second EV is a second test EV.

16. A method for recommending a test case (TC), the method comprising:
obtaining, by an analyzer, TCs and information about the TCs;
obtaining, by the analyzer, a document that is associated with the TCs;
analyzing, by the analyzer, the TCs, the information, and the document to generate a reference document (RD), wherein the RD comprises a dataset and metadata;
transforming, by the analyzer and via an embedding transform model, the RD into a first embedding vector (EV), wherein the first EV is stored in a vector database;
after storing the first EV:
receiving, by a visualizer, a query about a recommendation from an administrator, wherein the visualizer sends the query to the analyzer;
analyzing, by the analyzer, the query to infer a length of the query;
making, by the analyzer, a first determination that the length of the query is less than or equal to an input length of a test case recommendation model (TCRM);
in response to the first determination, transforming, by the analyzer and via the embedding transform model, the query into a second EV, wherein the query is provided to an engine;
performing, by the analyzer and using the second EV, a search for a most matching asset in the vector database, wherein the most matching asset is sent to the engine;
analyzing, by the engine and employing the TCRM, the query and the most matching asset to generate the recommendation;
making, by the engine, a second determination that the recommendation is generated;
based on the second determination, by the engine, sending the recommendation to the visualizer; and
initiating, by the visualizer, displaying of the recommendation to the administrator.

17. The method of claim 16, wherein the recommendation specifies at least a second TC, wherein the administrator implements the second TC to test a computing resource configuration on a computing device before deploying the computing device to a customer.

18. The method of claim 16, wherein the recommendation specifies at least a second TC, wherein the administrator implements the second TC to validate a failure associated with a computing device that is deployed to a customer, wherein the customer has reported the failure after initiating a data migration process from the computing device.

19. The method of claim 16, wherein the dataset comprises at least an identifier of a second TC and a test step description associated with the second TC.

20. The method of claim 16, wherein the metadata comprises at least one selected from a group consisting of a minimum release version of an application that needs to be installed on a computing device in order to implement a second TC on the computing device, a component area of a component that needs to be tested on the computing device by implementing a third TC, and test priority information associated with an operation that needs to be tested on the computing device before shipping the computing device to a customer.

* * * * *